US009100863B2

(12) United States Patent
Liu

(10) Patent No.: US 9,100,863 B2
(45) Date of Patent: Aug. 4, 2015

(54) CELLULAR BACKHAUL LOAD DISTRIBUTION

(71) Applicant: T-Mobile USA, Inc., Bellevue, WA (US)

(72) Inventor: Chunming Liu, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 286 days.

(21) Appl. No.: 13/722,118

(22) Filed: Dec. 20, 2012

(65) Prior Publication Data

US 2014/0177840 A1    Jun. 26, 2014

(51) Int. Cl.
*H04K 1/00*    (2006.01)
*H04W 28/08*    (2009.01)
*H04W 12/02*    (2009.01)

(52) U.S. Cl.
CPC .............. *H04W 28/08* (2013.01); *H04W 12/02* (2013.01)

(58) Field of Classification Search
CPC ............................... H04W 28/08; H04W 12/02
USPC ........................................... 380/270; 713/150
See application file for complete search history.

(56) References Cited

U.S. PATENT DOCUMENTS

2005/0159166 A1*   7/2005  Jonsson et al. ............. 455/452.2
2009/0318124 A1*   12/2009 Haughn ........................ 455/418
2010/0074105 A1    3/2010  Periyalwar et al.
2011/0149786 A1    6/2011  Radpour
2011/0235595 A1    9/2011  Mehta et al.
2012/0201197 A1*   8/2012  Cha et al. ...................... 370/328
2012/0314569 A1    12/2012 Liu et al.

FOREIGN PATENT DOCUMENTS

WO    WO2012148482    11/2012

OTHER PUBLICATIONS

PCT Search Report and Written Opinion mailed Feb. 28, 2014 for PCT Application No. PCT/US13/71535, 9 pages.

* cited by examiner

*Primary Examiner* — Dant Shaifer Harriman
*Assistant Examiner* — Abiy Getachew
(74) *Attorney, Agent, or Firm* — Lee & Hayes, PLLC

(57) ABSTRACT

A mobile carrier may selectively offload backhaul data traffic between cell sites and the core network to existing alternative relay networks to increase available backhaul bandwidth to meet higher data traffic demands without adding additional network infrastructure. Data traffic may be offloaded from a cellular network to the alternative relay network based on at least one of a bandwidth capacity of the alternative relay network, a bandwidth availability of the alternative relay network, or a data class of the data. The amount of data that is offloaded to the alternative relay network may then be adjusted based on a blocking probability that is calculated for the alternative relay network.

20 Claims, 12 Drawing Sheets

CELLULAR BACKHAUL LOAD DISTRIBUTION

BACKGROUND

A network infrastructure that is used by a mobile telecommunication carrier to transport data traffic between cell sites and a core network (e.g., a mobile switching office) of the telecommunication carrier is generally referred to as the backhaul. A cell site may include a base transceiver station (BTS) in the context of a 2G communication network, a Node B in the context of a 3G communication network, or an eNode B in the context of a 4G/LTE communication network. A backhaul may be implemented using copper cables, fiber optic cables, Worldwide Interoperability for Microwave Access (WiMAX) transceivers, microwave radio transceivers, and/or so forth. As consumers increase their data usage on their mobile telecommunication devices, there are increased demands on telecommunication carriers to increase the data carrying capacities of their backhauls. However, the installation, leasing, and/or maintenance of additional network infrastructures to support increased backhaul data carrying capacities may place heavy financial burden on a mobile telecommunication provider. Such financial burden may cause implementation delays and degraded quality of service.

Further, the sole use of WiMax transceivers or microwave radio transceiver to increase the data carrying capacity of a backhaul between the cell sites and a core network of a telecommunication carrier may have drawbacks. Due to the limited wireless transmission distances of such transceivers, data are transmitted via multiple hops as they are routed between the core network and the cell sites. The wireless transmission distances and the use of multiple hops may result in increased radio tower construction, increase spectrum usage, increased design complexity, increased equipment maintenance cost, in order to improve the data carrying capacity of backhauls.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
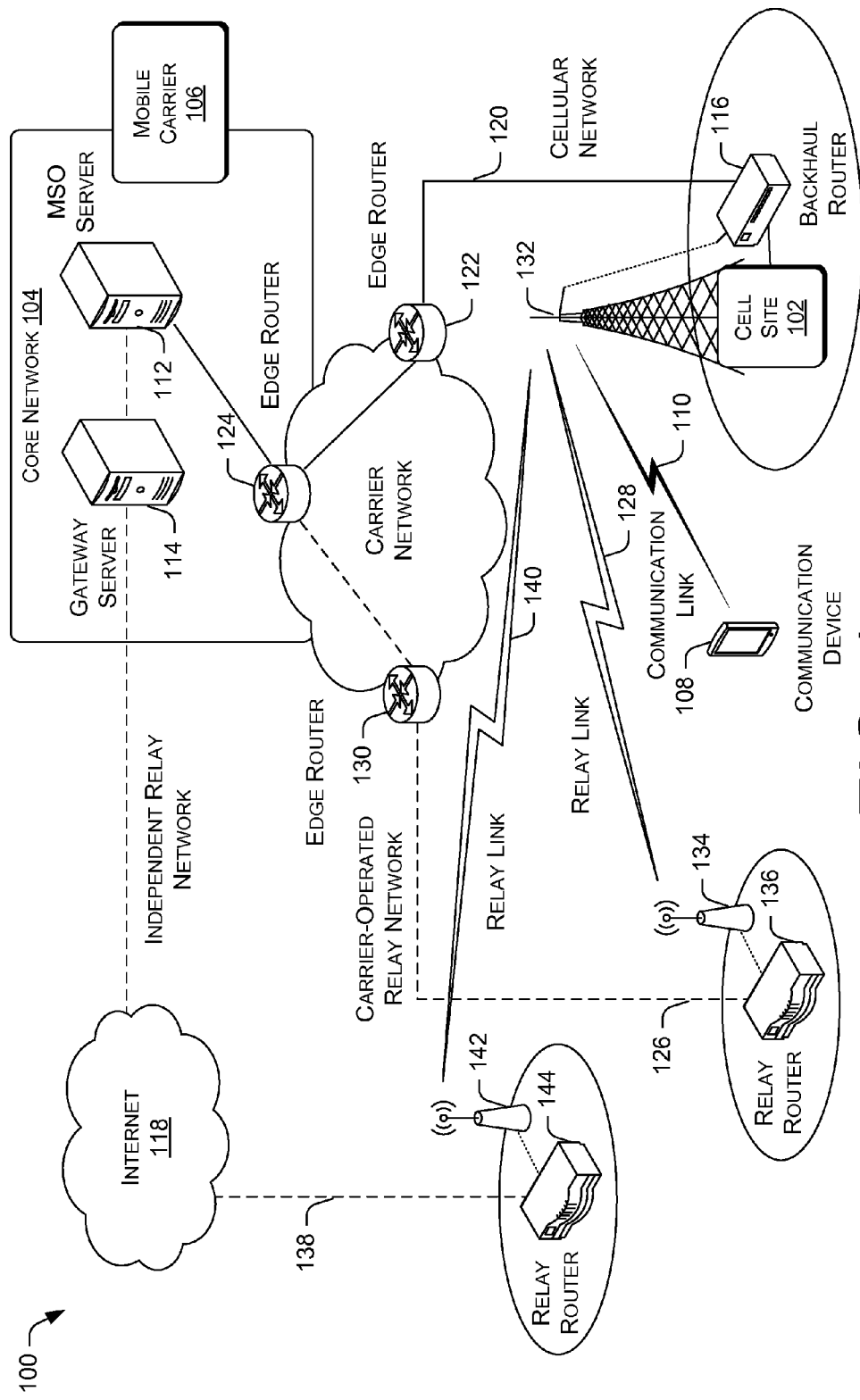
FIG. 1 is a block diagram showing an illustrative environment for allocating backhaul data traffic between a cellular network and an alternative relay network.

Described herein are techniques for selectively offloading the transmission of backhaul data traffic between cell sites and a core network of a mobile telecommunication carrier from a cellular network to an alternative relay network. The data traffic may encapsulate both voice communication and data communication. A cell site may include a base transceiver station (BTS) in the context of a 2G communication network, node B in the context of a 3G communication network, or eNode B in the context of a 4G/LTE communication network. A core network is a central part of a mobile telecommunication network that routes voice or data between cell sites as well as to and from other networks operated by additional mobile telecommunication carriers.

A cellular network may be a dedicated network that is owned and/or leased by the mobile telecommunication carrier to exclusively transport backhaul data traffic between the cell sites and the core network. In some embodiments, the alternative relay network may be a data network that is commonly owned by the mobile telecommunication carrier, but is used by the mobile telecommunication carrier by default for a purpose other than transport backhaul data traffic between the cell sites and the core network. For instance, the mobile telecommunication carrier may use the data network to provide Internet service to businesses and/or residences. Accordingly, such a carrier-operated data network, although operated by the same mobile telecommunication carrier, may have divergent bandwidth capabilities and experience varied traffic loads at different times than the cellular network. In one example, network traffic on a carrier-operated data network that serves an airport may have less data traffic during nights than at daytimes, since fewer airlines arrange flights at nights and fewer passengers at the airport use Wi-Fi hotspots provided by the airport. As such, surplus bandwidth available from the carried-owned data network may be used to supplement the backhaul bandwidth of the cellular network at various times.

In other embodiments, the alternative relay network may be an independent data network that is unassociated with the mobile telecommunication carrier, such as a data network that is operated by another mobile telecommunication carrier. The independent data network may also have divergent bandwidth capabilities and experience varied traffic loads at different times than the cellular network. In this way, offloading data traffic to the independent data network from the cellular network may increase the overall backhaul bandwidth available to the mobile telecommunication carrier.

The mobile telecommunication carrier may use a backhaul relay router to control the offloading of backhaul data traffic from the cellular network to the alternative relay network. The backhaul relay router may take into account factors such as available cellular network bandwidth, available alternative relay network bandwidth, minimum relay network bandwidth reservation, and/or quality of service (QoS) consideration with respect to the alternative relay network. The QoS considerations may include data throughput, packet drop rate, transmission error rate, latency, jitter, and/or so forth.

In some instances, the backhaul relay router may also take the class of data that is transported between cell sites and the core network into account. The different classes of data may include voice data, network control data, non-real time streaming data, real-time streaming data, background data, best effort data, and/or so forth. For example, the backhaul relay router may route the transport of non-real time streaming data between a cell site and the core network to an alternative relay network whenever possible, while consistently allocating the cellular network to transport voice data between the cell site and the core network.

The backhaul relay router may be deployed in association with a cell site or several cell sites. The backhaul relay router may be incorporated into equipment that serves a BTS, a node B, or an eNode B. The backhaul relay router may cause a transceiver of a cell site to route data traffic to a transceiver of an alternative relay network using various wireless communication links. Such links may include a Wi-Fi link, a WiMax link, a microwave link, and/or a satellite data link. Accordingly, the alternative relay network may act in place of the cellular network to transport data traffic between the cell site and the core network of the mobile telecommunication carrier.

Thus, by selectively offloading backhaul data traffic between cell sites and the core network to existing alternative relay networks, a mobile telecommunication carrier may increase available backhaul bandwidth to meet higher data traffic demands without adding additional network infrastructure. Further, since offloading of the backhaul data traffic to an alternative relay network is performed based on bandwidth and QoS considerations, the distribution of the backhaul data traffic may maintain high quality service regardless of whether the cellular network or the alternative relay network is used.

Overview

FIG. 1 is a block diagram showing an illustrative environment 100 for allocating backhaul data traffic between a cellular network and an alternative relay network. The environment 100 may include a cell site 102 and a core network 104 of a mobile telecommunication network that is operated by a mobile carrier 106. The cell site 102 may include radio transceivers that communicate with electronic devices, such as the communication device 108, via a communication link 110. For example, the cell site may be a BTS, a Node B, or an eNode B. The communication device 108 may be a mobile phone, a tablet computer, a portable computer, or any other portable electronic device that is equipped with cellular communication components that enable the portable electronic device to exchange voice and digital data with the mobile telecommunication network.

The core network 104 is a central part of the mobile telecommunication network. The core network 104 may include a mobile switch office (MSO) server 112, or an equivalent entity, that routes voice or data between cell sites, as well as to and from other networks operated by additional mobile telecommunication carriers. The core network 104 may also include a gateway server 114 that routes data traffic from the Internet 118 to the MSO server 112, and vice versa.

Data traffic may move between the cell site 102 and the core network 104 via a cellular network 120. The cellular network 120 may be a dedicated network that is owned and/or leased by the mobile telecommunication carrier to exclusively transport backhaul data traffic between the cell site 102 and the core network 104. For example, the communication network portion between the cell site 102 and the edge router 122 may be leased by the mobile carrier 106 from another service provider, while the communication network portion between the edge router 122 and the edge router 124 may be owned by the mobile carrier 106. Accordingly, communications that originate from the communication device 108 may be routed to the core network 104 via the cellular network 120. The MSO server 112 of the core network 104 may route data communication (e.g., request for a web page) to the Internet 118, voice communication to a telephone switching network, and/or so forth.

However, a backhaul router 116 that is associated with the cell site 102 may also offload some data traffic to alternative relay networks. In various embodiments, the backhaul router 116 may be incorporated into equipment that serves the cell site 102. The backhaul router 116 may offload data traffic to the relay network 126. The relay network 126 may be a carrier-operated relay network, as at least a portion of the network or the entirety of the network is operated by the mobile carrier 106. For example, the communication network portion of the relay network 126 that is between the edge router 130 and the edge router 124 may share the same overall network infrastructure as the cellular network 120, although the data traffic may be carried by separate physical and/or virtual data connections (e.g., separate fiber optic cables). As described herein, edge routers are routers that relay data between different network portions of a network. The carrier-operated relay network 126 may be normally operated by the mobile carrier 106 for a purpose other than transport backhaul data traffic between the cell site 102 and the core network 104. For instance, the carrier-operated relay network 126 may actually be a network that is primarily used by the mobile carrier 106 to provide Internet service to businesses and/or residences.

The backhaul router 116 may offload data traffic to the carrier-operated relay network 126 via a wireless relay link 128 that is formed between a transceiver 132 of the cell site 102 and a transceiver 134 of the carrier-operated relay network 126. The wireless relay link 128 may be a Wi-Fi link, a WiMax link, a microwave link, and/or a satellite data link. For example, the transceivers 134 and 132 may be Wi-Fi transceivers when the wireless relay link 128 is a Wi-Fi link. In turn, the transceiver 134 may be connected to a relay router 136. The relay router 136 may be responsible for routing the Ethernet data traffic through the carrier-operated relay network 126 to the core network 104.

Alternatively, the backhaul router 116 may offload data traffic to an independent relay network 138. The independent relay network 138 may be operated by an Internet service provider (ISP) other than the mobile carrier 106. The backhaul router 116 may offload data traffic to the independent relay network 138 via a wireless relay link 140 that is formed between the transceiver 132 of the cell site 102 and a transceiver 142 of the independent relay network 138. The wireless relay link 140 may be a Wi-Fi link, a WiMax link, a microwave link, and/or a satellite data link. For example, the transceivers 142 and 132 may be Wi-Fi transceivers when the wireless relay link 140 is a Wi-Fi link. In turn, the transceiver 142 may be connected to a relay router 144. The relay router 144 may be responsible for routing the Ethernet data traffic through the Internet 118 to the core network 104. For instance, the data traffic routed by the relay router 144 may pass through the gateway server 110 of the core network 104 to reach the MSO server 112.

The backhaul router 116 may use a backhaul control algorithm to offload data traffic from the cellular network 120 to the carrier-operated relay network 126 or the independent relay network 138. In various embodiments, the backhaul control algorithm may take into account factors such as available cellular network bandwidth, available alternative relay network bandwidth, minimum relay network bandwidth reservation, and/or quality of service (QoS) consideration with respect to the respective alternative relay network. The QoS considerations may include data throughput, packet drop rate, transmission error rate, latency, jitter, and/or so forth.

In some instances, the backhaul control algorithm may also take the class of data that is transported between cell sites and the core network into account. The different classes of data may include voice data, network control data, non-real time streaming data, real-time streaming data, background data, best effort data, and/or so forth. For example, the backhaul control algorithm may route the transport of non-real time streaming data between the cell site 102 and the core network 104 to an alternative relay network whenever possible, while consistently allocating the cellular network to transport voice data between the cell site and the core network.

In this way, the backhaul router 116 may offload data traffic from the cellular network 120 to an alternative relay network during periods of high data usage, such as that the QoS for handling data traffic for communication devices (e.g., communication device 108) may be maintained. Further, in some instances, the independent relay network 138 may serve as a backup data communication network during periods of cellular network outage.

While the environment 100 is illustrated for the sake of simplicity as having the carrier-operated relay network 126 and the independent relay network 138, there may be multiple carrier-operated relay networks and multiple independent relay networks that are used by the backhaul router 116 for offloading data traffic between the cells site 102 and the core network 104 in other embodiments. Further, there may be multiple backhaul routers that are associated with multiple cell sites in other embodiments of the environment 100.

Example Backhaul Router Components

Figure 2:
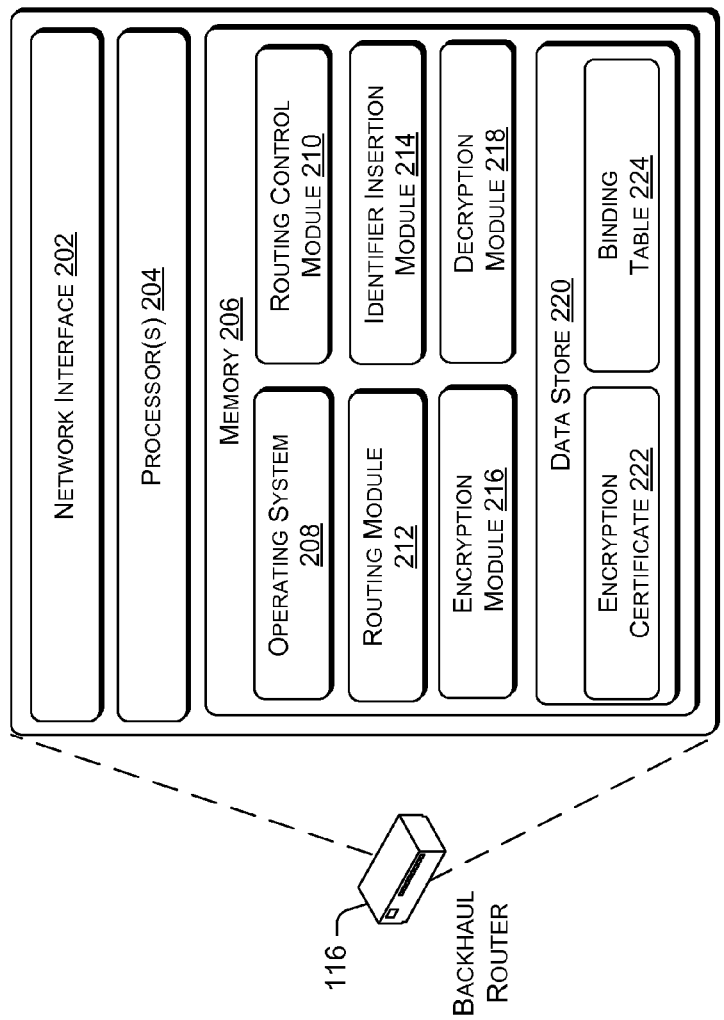
FIG. 2 is a block diagram that illustrates selected components of a backhaul router of a mobile telecommunication network that distributes data traffic between the cellular network and an alternative relay network.

FIG. 2 is a block diagram that illustrates selected components of the backhaul router 116 that distributes data traffic between the cellular network 120 and an alternative relay network, such as the carrier-operated relay network 126 or the independent relay network 138.

The backhaul router 116 may include network interface 202, one or more processors 204, memory 206, and/or user controls that enable a user to interact with the router. The network interface 202 may include wireless and/or wired communication components that enable the router to transmit data to and receive data from other network devices.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 204 and the memory 206 of the backhaul router 116 may implement an operating system 208. The operating system 208 may include components that enable the backhaul router 116 to receive and transmit data via various inputs (e.g., user controls, network interfaces, and/or memory devices), as well as process data using the one or more processors 204 to generate output. The operating system 208 may include a presentation component that presents the output (e.g., display the data on an electronic display, store the data in memory, transmit the data to another electronic device, etc.). Additionally, the operating system 208 may include other components that perform various additional functions generally associated with an operating system.

The one or more processors 204 and the memory 206 of the backhaul router 116 may also implement a routing control module 210, a routing module 212, an identifier insertion module 214, an encryption module 216, and a decryption module 218. The memory 206 may also include a data store 220.

The routing control module 210 may include a backhaul control algorithm that conditionally offloads data traffic from the cellular network 120 to an alternative relay network, such as the carrier-operated relay network 126 or the independent relay network 138. The backhaul control algorithm may take into consideration the bandwidth capacities and availabilities of the cellular network 120 and the alternative relay network, and/or other factors.

For example, given that there are a total of K service types, and for each service j, the requested bandwidth may be represented bj. Further, assuming that the total backhaul bandwidth for the alternative relay network is represented by Bw, bandwidth/capacity for wireless relay link is represented by Br, and backhaul bandwidth in cellular cell is Bc. In some embodiments, network allocation may be achieved by synchronizing the three network parts in a time sequence and divide the overall time into time slots.

Thus, at time slot i, the real backhaul traffic load for the alternative relay network may be represented by Lw(i), and the backhaul traffic load for cell site 102 may be represented by Lc(i). Taken into account wireless signal quality fluctuation, the real throughput of wireless relay link at time i may be represented by Tr(i). Accordingly, the total bandwidth requirement for the cell site 102 may be represented as $\Sigma_{j=1}^{K} n_{c_j}(i) * b_{c_j}$, in which $n_{c_j}(i)$ represents the request number of service j in cellular cell at time i, and $b_{c_j}$ is the bandwidth of service j in the cellular network 120. Similarly, the total bandwidth requirement for the alternative relay network may be represented as $\Sigma_{j=1}^{K} n_{w_j}(i) * b_{w_j}$, where $n_{w_j}(i)$ represents the request number of service j in the alternative relay network at time slot i, and $b_{w_j}$ represents the average bandwidth requirement of service j in the alternative relay network.

As a result, $Blw(i) = \min(0, Bw - \Sigma_{j=1}^{K} n_{w_j}(i) * b_{w_j})$ may present the idle bandwidth of the alternative relay network at time i, and the bandwidth to be relayed in the cellular network 120 at time i may be represented as $BIc(i)=\max(0, \Sigma_{j=1}^{K}n_{c_j}(i)*b_{c_j}-Bc)$. Further, the maximum amount of backhaul data traffic R(i) that can be offloaded from the cellular network 120 to the alternative relay network at time i may be denoted as follows:

$$BR(i) \leq \min\{Tr(i), \min[BIw(i), BIc(i)]\} \quad (1)$$

Thus, in at least one embodiment, the data traffic distribution implemented by the backhaul control algorithm of the routing control module 210 in accordance with the HCF controlled access (HCCA) polling scheme may be expressed as follows:

At step 1, the backhaul control algorithm may compute the number of MAC service data units (MSDU), $N_i$, that arrive at the mean data rate, $\rho_i$, during a scheduled service interval (SI) as:

$$N_i = \left\lceil \frac{SI \times \rho_i}{L_i} \right\rceil \quad (2)$$

in which $L_i$ represents the nominal size of a packet in service i.

At step 2, the backhaul control algorithm may calculate a transmit opportunity (TXOP) as:

$$TXOP_i = \max\left(\frac{N_i \times L_i}{R_i} + O, \frac{M}{R_i} + O\right) \quad (3)$$

in which $R_i$ represents the minimum physical transmission rate, M represents the maximum size of a MSDU, and O represents the overhead in time units.

At step 3, if there are already m connections, the backhaul control algorithm notes a new flow m+1 may be accepted if the new flow satisfies:

$$\frac{TXOP_{m+1}}{SI} + \sum_{i=1}^{m} \frac{TXOP_i}{SI} \leq 1 \quad (4)$$

In the above, it is assumed that service intervals are used by only the HCCA polling method without time for enhanced distributed channel access (EDC) contention based traffic. Further, $R_i$ may be constrained by both the physical transfer rate (radio air rate) of the alternative relay network and transport (backhaul) rate of the alternative relay network, and may be represented as:

$$R_i = \min(R_{air}(i), R_{transport}) \quad (5)$$

At step 4, taking into account that the relayed traffic from the cellular network 120 and that partial $R_{transport}$ may be used to relayed data traffic, $RL\% \times R_{transport}$, the operations performed by the backhaul control algorithm may be constrained by a modified version of equation (5), as follows, $$R_i = \min(R_{air}(i), R_{transport} \times (1-RL\%)) \quad (6)$$

As such, BR(i) in equation (1) may be further denoted as:

$$BR(i) = RL\% \times R_{transport} \quad (7)$$

s.t. $BR(i) \leq \min\{Tr(i), \min[BIw(i), BIc(i)]\} RL\% < 1$

Thus, consider that a calling rate of the alternative relay network for service i may be $\lambda_i$, and an average service time for service i in the alternative relative network may be $\mu_i$, then at state $\pi_i$ ($\lambda_0, \ldots \lambda_i \ldots$) for all services, the blocking probability may be calculated as $P_b(\pi_i)$. However, since the QoS of the alternative relay network aims to provide service with $P_b(\pi_i) \leq P(i)$, then the relayed bandwidth is may be expressed as:

$$BR(i) = RL\% \times R_{transport} \quad (8)$$

s.t. $BR(i) \leq \min\{Tr(i), \min[BIw(i), BIc(i)]\} P_b(\pi_i) \leq P(i)$ & $RL\% < 1$ According to equation (8), if a relay router of the alternative relay network detects blocking probability is above threshold probability P(i), then the backhaul control algorithm may reduce the RL % so as to reduce the blocking probability in the alternative relay network.

Since relay data service is a kind of "best-effort" service, the backhaul control algorithm may weigh QoS provisioning in the alternative relay network more than the amount of relayed traffic. Accordingly, the backhaul control algorithm may use a binary search technique to find an appropriate value of RL % for cases in which the blocking probability of a service i is above the threshold P(i). On the other hand, if the blocking probability of a service i is below threshold P(i), the backhaul control algorithm may increase the current RL % by a step $\Delta_{RL}$.

In some embodiments, the backhaul control algorithm may set the length of each time slot equal to the service interval (SI). Accordingly, a watch window may be set with a window size of N*SI (N>=1). As such, the backhaul control algorithm may calculate the blocking probability of service i at the end of SI j as follows:

$$Pb(i,j+1) = \Sigma_{j-N}^{j} w_k \times Pb(i,k) \quad (9)$$

Thus, the backhaul control algorithm may calculate amounts of data to be offloaded (i.e., relay percentage) from the cellular network 120 to an alternative relay network over time, block probabilities of the alternative relay network over time, as well as incremental increases or decreases in the amount of data offloaded over time based on the network variables associated with the alternative relay network and/or the cellular network 120.

In other embodiments, the backhaul control algorithm may also take the class of data that is transported between cell sites and the core network into account. The different classes of data may include voice data, network control data, non-real time streaming data, real-time streaming data, background data, best effort data, and/or so forth. For example, the backhaul control algorithm may route the transport of non-real time streaming data between the cell site 102 and the core network 104 to an alternative relay network whenever possible, while consistently allocating the cellular network to transport voice data between the cell site and the core network. In another example, the backhaul control algorithm may use a corresponding initial relay percentage that is configured for each class of data that is transported by an alternative relay network. In such example, the initial relay percentage for non-real time streaming data may be set higher than for real-time streaming data, while the initial relay percentage of real-time streaming data may be set higher than for voice data. Alternatively or concurrently, the backhaul control algorithm may be configured to use a particular alternative relay network for transporting a particular class of data. For example, the backhaul control algorithm may be configured to use the independent relay network 138 to transport best effort data, while use the carrier-operated relay network 126 to transport background data.

In still other embodiments, the backhaul control algorithm may selectively throttle backhaul data traffic to be offloaded to an alternative relay network based on a priority assigned to each data class of data in the backhaul data traffic. For example, in one implementation, voice data may have the highest priority, network control data may have a second highest priority, non-real time streaming data may have a third highest priority, real-time streaming data may have a fourth highest priority, background data may have a fifth highest priority, best effort data may have a sixth highest priority, and so on and so forth. In various embodiments, the backhaul control algorithm may selectively throttle the off-loading of backhaul data traffic when there is insufficient available bandwidth for an alternative relay network to carry the entire backhaul data traffic for a particular time interval. Additional details regarding the operations of the backhaul control algorithm are further illustrated with respect to FIGS. 5 and 12.

The routing module 212 may route data frames that are destined for the core network 104, i.e., uplink data frames, as directed the routing control module 210. The routing module 212 may receive data packets for such data frames from the cell suite 102. Accordingly, the routing module 212 may route the uplink data frames to the cellular network 120 or an alternative relay network, such as the carrier-operated relay network 126 or the independent relay network 138. The routing module 212 may also receive downlink data frames from the core network 104, as routed to the backhaul router 116 by the relay router 136 or the relay router 144. The routing module 212 may relay the data packets in such downlink data frames to the cell site 102 for distribution to communication devices, such as the communication device 108.

The identifier insertion module 214 may insert an identifier into an uplink data frame that is to be routed from the cell site 102 to the core network 104 via the carrier-operated relay network 126. The uplink data frame may include an uplink data packet. The identifier insertion module 214 may be controlled by the routing module 212. The inserted identifier may be a VLAN ID (e.g., IEEE 802.1Q conformant tag) that identifies the relay router 136 of the carrier-operated relay network 126. Subsequently, the routing module 212 may route the uplink data packet to the relay router 136 according to the inserted identifier.

The encryption module 216 may encrypt an uplink data packet and a private source address of the backhaul router 116 with a public key associated with an encryption certificate 222 to form an uplink datagram. The uplink data packet may be a data packet that originated from the communication device 108 and is transmitted to the cell site 102. The encryption module 216 may perform such encryption as directed by the routing module 212, when the uplink data packet is to be routed to the core network 104 via the independent relay network 138. In this way, only the MSO server 112 of the core network 104 may decrypt the uplink datagram to obtain the uplink data packet.

Following the creation of the datagram, the routing module 212 may append a public destination address of the core network 104 and a transfer label to the datagram. The transfer label may include information that identifies the cell site 102. In some embodiments, the transfer label may be in the form of a multiprotocol label switching (MPLS) label. However, transfer labels associated with other network data redirection techniques may be used in other embodiments provided they achieve the same purpose. Subsequently, the routing module 212 may send the datagram to the relay router 144 of the independent relay network 138. In various embodiments, the private source address and the public destination address may be Internet Protocol (IP) addresses.

The decryption module 218 may decrypt a downlink datagram that is received from the relay router 144. The downlink datagram may include a downlink data packet that originated from the core network 104. The decryption module 218 may perform the decryption as directed by the routing module 212. The decryption module 218 may decrypt the downlink datagram using a private key associated with the encryption certificate 222 to extract the downlink data packet. Subsequently, the routing module 212 may relay the downlink data packet to the cell site 102 for distribution to a communication device, such as the communication device 108.

The data store 220 may store the encryption certificate 222 and a binding table 224. The binding table 224 may include data that enables the backhaul router 116 to route uplink data packets to the core network 104 through an alternative relay network. In at least one embodiment, a table entry in the binding table 224 may include the following associated information:

| MSO public IP | VLAN ID | MPLS label | IP address | IP Address of relay router | Certificate file |
|---|---|---|---|---|---|
| x.y.z.k | 1221 | YYYYYYY | 192.168.x.y/28 | 140.x.y.z/28 | *.cer |

As shown in the table entry, the "MSO public IP" may be the public destination address of the MSO server 112 in the core network 104. The "VLAN ID" may be the identifier of the relay router 136 or the relay router 144. The "IP address" may be the private IP address of the backhaul router 116. The "IP Address of relay router" may be the IP address of the relay router 136 or the relay router 144. Further, the "the certificate file" may designate the specific encryption certificate (e.g., encryption certificate 222) that is used for the encryption of data packets and the decryption of datagrams.

While the backhaul router 116 is illustrated in FIG. 2 as having the modules 206-218, the backhaul router 116 may also include other software and hardware components that are commonly present in other routers. For example, such components may include components that provide a firewall function, a packet forwarding function, a proxy function, user interface functions, and/or so forth.

Example Relay Router Components

Figure 3:
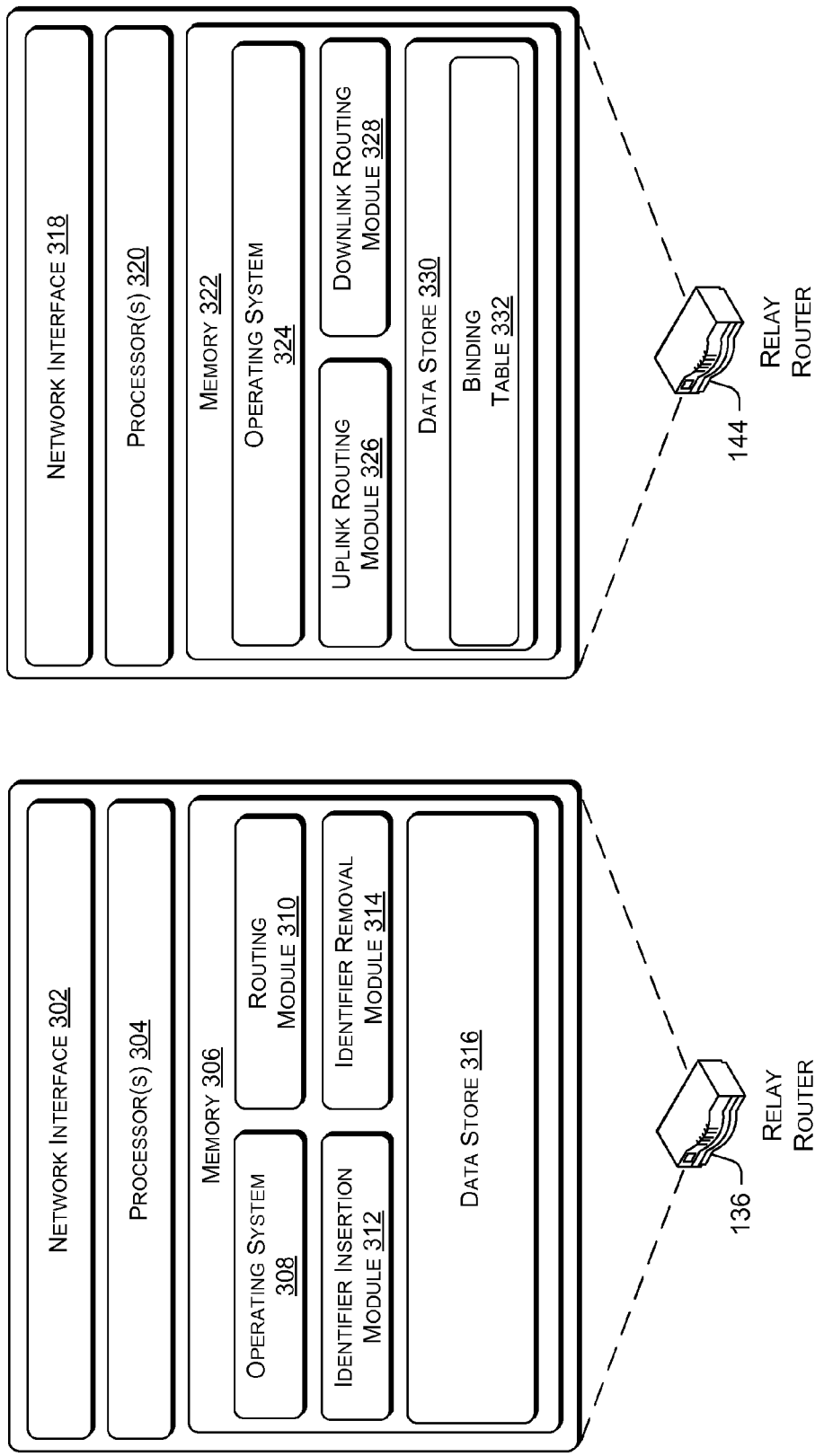
FIG. 3 is a block diagram that illustrates selected components of relay routers of alternative relay networks that route data between a cell site and a core network.

FIG. 3 is a block diagram that illustrates selected components of relay routers of alternative relay networks that route data between a cell site and a core network. The relay router 136 may include network interface 302, one or more processors 304, memory 306, and/or user controls that enable a user to interact with the router. The network interface 302 may include wireless and/or wired communication components that enable the router to transmit data to and receive data from other network devices.

The memory 306 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 304 and the memory 306 of the relay router 136 may implement an operating system 308. The operating system 308 may include components that enable the relay router 136 to receive and transmit data via various inputs (e.g., user controls, network interfaces, and/or memory devices), as well as process data using the one or more processors 304 to generate output. The operating system 308 may include a presentation component that presents the output (e.g., display the data on an electronic display, store the data in memory, transmit the data to another electronic device, etc.). Additionally, the operating system 308 may include other components that perform various additional functions generally associated with an operating system.

The one or more processors 304 and the memory 306 of the relay router 136 may also implement a routing module 310, an identifier insertion module 312, and an identifier removal module 314. The memory 306 may also include a data store 316.

The routing module 310 may route an uplink data packet to the core network 104 based on an identifier in the uplink data packet. Further, the routing module 310 may route a downlink data packet to the backhaul router 116 based on an identifier in the downlink data packet. The routing module 310 may also control the identifier insertion module 312 and the identifier removal module 314.

The identifier insertion module 312 may insert a second identifier into an uplink data frame that is received from the cell site 102 and destined to be transported to the core network 104 by the carrier-operated relay network 126. As described above, the uplink data frame may already include a first identifier that was inserted by the backhaul router 116. The inserted second identifier may be a second VLAN ID (e.g., IEEE 802.1Q conformant tag) that identifies the MSO server 112 of the core network 104. Subsequently, the routing module 310 may route the uplink data frame to the relay router 136 according to the inserted identifier.

The identifier removal module 314 may modify a downlink data frame that is received from the core network 104 via the carrier-operated relay network 126. The received downlink data frame may include two identifiers. The first identifier may be a VLAN ID (e.g., IEEE 802.1Q conformant tag) that identifies the relay router 136. The second identifier may be a VLAN ID (e.g., IEEE 802.1Q conformant tag) that identifies the backhaul router 116. The identifier removal module 314 may remove the first identifier that identifies the relay router 136 from the downlink data frame. Subsequently, the routing module 310 may route the downlink data frame to the backhaul router 116 according to the second identifier.

The data store 316 may store information that is used by the modules of the relay router 136. In various embodiments, the data store 316 may store the identifier of the MSO server 112 and the identifier of the backhaul router 116. While the relay router 136 is illustrated in FIG. 3 as having the modules 308-314, the relay router 136 may also include other software and hardware components that are commonly present in other routers. For example, such components may include components that provide a firewall function, a packet forwarding function, a proxy function, user interface functions, and/or so forth.

The relay router 144 may include network interface 318, one or more processors 320, memory 322, and/or user controls that enable a user to interact with the router. The network interface 318 may include wireless and/or wired communication components that enable the router to transmit data to and receive data from other network devices.

The memory 322 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 320 and the memory 322 of the relay router 144 may implement an operating system 324. The operating system 324 may include components that enable the relay router 136 to receive and transmit data via various inputs (e.g., user controls, network interfaces, and/or memory devices), as well as process data using the one or more processors 304 to generate output. The operating system 324 may include a presentation component that presents the output (e.g., display the data on an electronic display, store the data in memory, transmit the data to another electronic device, etc.). Additionally, the operating system 208 may include other components that perform various additional functions generally associated with an operating system.

The one or more processors 320 and the memory 322 of the relay router 144 may also implement an uplink routing module 326 and a downlink routing module 328. The memory 306 may also include a data store 330.

The uplink routing module 326 may receive a datagram from the cell site 102 as routed by the backhaul router 116. The datagram may have a public destination address of the MSO server 112 of the core network 104 and a MPLS label. The uplink routing module 326 may append a public IP address of the relay router 144 to the datagram. The public IP address of the relay router 144 may act as a public source address. Subsequently, the uplink routing module 326 may route the datagram to the MSO server 112 of the core network 104 using the public destination address.

The downlink routing module 328 may receive a datagram from the core network 104 as routed by the MSO server 112, in which the datagram may have a MPLS label. The downlink routing module 328 may use the binding table 332 to determine whether MPLS label corresponds to a private IP address of a backhaul router. Thus, if the downlink routing module 328 determines that the MPLS label corresponds to a private IP address of a backhaul router (e.g., backhaul router 116), the downlink routing module 328 may route the datagram to the corresponding backhaul router. On the other hand, if the downlink routing module 328 is unable to match the MPLS label to a private IP address of a backhaul router using the binding table 332, the downlink routing module 328 may drop the datagram, i.e., terminate the routing of the datagram.

The data store 330 may store the binding table 332 and the public IP address of the relay router 144. The binding table 332 may include data that enables the relay router 144 to route downlink data packets to the backhaul router 116. In at least one embodiment, a table entry in the binding table 332 may include the following associated information:

| Public IP address of relay outer | MPLS label | Private IP of backhaul router | Port for relay |
|---|---|---|---|
| 140.x.y.z/28 | XXXXXX1 | 5.168.x.y/28 | 8002 |

As shown in the table entry, the "Public IP address of relay router" may be the public destination address of the relay router 144. The "MPLS Label" may be a publically visible unencrypted identifier of a backhaul router. The "Private IP of the backhaul router" may be the private IP address of the backhaul router 116 that can be used to route a downlink datagram to the backhaul router 116. This private IP address of the backhaul router 116 may be known only to the relay router 144. The "Port for Relay" may be the relay port that is used by the relay router 136 to route the downlink datagram to the backhaul router 116.

While the relay router 144 is illustrated in FIG. 3 as having the modules 308-314, the relay router 144 may also include other software and hardware components that are commonly present in other routers. For example, such components may include components that provide a firewall function, a packet forwarding function, a proxy function, user interface functions, and/or so forth.

Example MSO Server Components

Figure 4:
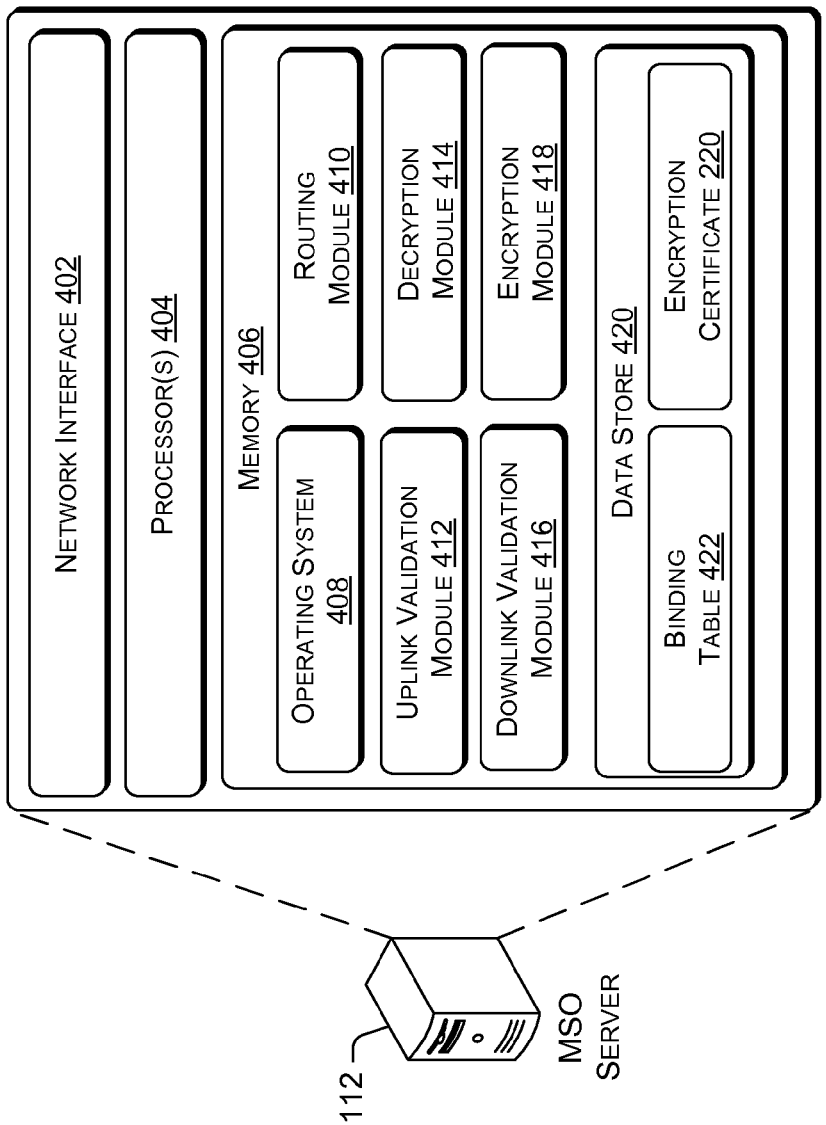
FIG. 4 is a block diagram that illustrates selected components of a MSO server of a mobile telecommunication network that routes data packets between a core network and a cell site.

FIG. 4 is a block diagram that illustrates selected components of a MSO server 112 of a mobile telecommunication network that routes data packets between a core network and a cell site.

The MSO server 112 may include network interface 402, one or more processors 404, memory 406, and/or user controls that enable a user to interact with the router. The network interface 402 may include wireless and/or wired communication components that enable the router to transmit data to and receive data from other network devices.

The memory 406 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 404 and the memory 406 of the MSO server 112 may implement an operating system 408. The operating system 408 may include components that enable the MSO server 112 to receive and transmit data via various inputs (e.g., user controls, network interfaces, and/or memory devices), as well as process data using the one or more processors 404 to generate output. The operating system 408 may include a presentation component that presents the output (e.g., display the data on an electronic display, store the data in memory, transmit the data to another electronic device, etc.). Additionally, the operating system 208 may include other components that perform various additional functions generally associated with an operating system.

The one or more processors 404 and the memory 406 of the MSO server 112 may also implement a routing module 410, an uplink validation module 412, a decryption module 414, a downlink validation module 416, and an encryption module 418. The memory 406 may also include a data store 420.

The routing module 410 may receive uplink data packets that are destined for the core network 104. In some instances, the uplink data packets may be encapsulated in uplink data frames that are received from the cellular network 120 and the carrier-operated relay network 126. In such instances, the routing module 410 may extract an uplink data packet from an uplink data frame for routing to another destination. For example, the routing module 410 may route the uplink data packet to a component in the core network 104 that processes the uplink data packet, or package the uplink data packet in another data frame for transport to another component that is outside of the core network 104.

In other instances, the uplink data packets may be encapsulated in uplink datagrams that are received from the independent relay network 138. In such instances, the uplink validation module 412 may be used by the routing module 410 to validate that a received uplink datagram is a datagram that originated from a valid cell site, such as the cell site 102. The uplink validation module 412 may the validation based on the public source address and the MPLS label of the uplink datagram. The uplink validation module 412 may consider the public source address of the uplink datagram valid when the public source address is a public IP address of a registered relay router (e.g., relay router 144) that is stored in a table entry in the binding table 422. Further, the uplink validation module 412 may consider the MPLS label valid when the MPLS label identifies an associated backhaul router (e.g., backhaul router 116) that is capable of routing data packets to the registered relay router, as indicated by the same table entry in the binding table 422. For example, a table entry in the binding table 422 may contain the following information:

| Cell ID | VLAN ID | MPLS label | IP address | VLAN ID of relay router | Public IP of relay router | Certificate file |
|---|---|---|---|---|---|---|
| 001 | 1221 | YYYYYYY | 192.168.x.y/28 | 2201 | 140.x.y.z/28 | *.cer |

As shown in the table entry, the "cell ID" may be the cell identifier of the cell site 102. The "VLAN ID" may be an identifier of the backhaul router 116 that is associated with the cell site 102. The "MPLS label" may be a publically visible unencrypted identifier that identifies the backhaul router 116. The "IP address" may be the private IP address of the backhaul router 116. The "VLAN ID" of the relay router may be an identifier of the relay router 144. The "Public IP address of relay router" may be the public destination address of the relay router 144. Further, the "the certificate file" may designate the specific encryption certificate (e.g., encryption certificate 222) that is used for the encryption of data packets and the decryption of datagrams.

The decryption module 414 may be used by the routing module 410 to decrypt a validated uplink datagram. The decryption of the validated uplink datagram may be accomplished by the decryption module 414 using a private key that is associated with the encryption certificate 222. The decryption may produce an uplink data packet and a private source address. The private source address may be the private IP address of the backhaul router that originated the validated uplink datagram (e.g., backhaul router 116). As such, the routing module 410 may use the uplink validation module 412 to validate the private source address using the binding table 422. For example, if the private source address that is decrypted matches the private source address listed in the table entry of the binding table 422 that is previously used to validate the corresponding uplink datagram, the uplink validation module 412 may consider the private source address valid. Once the private source address is determined to be valid, the routing module 410 may process the uplink data packet that is decrypted. For example, the routing module 410 may route the uplink data packet to a component in the core network 104 that processes the uplink data packet, or package the uplink data packet in another data frame for transport to another component that is outside of the core network 104.

Additionally, the routing module 410 may route downlink data packets that are destined to be transported from the core network 104 to the cell site 102 through one of the cellular network 120, the carrier-operated relay network 126, or the independent relay network 138. In various embodiments, each downlink data packet may be routed through one of the networks based on which network was used to transport an associated uplink data packet to the core network 104. For example, if an associated uplink data packet was transported from the backhaul router 116 to the core network 104 via the cellular network 120, then the routing module 410 may route a corresponding downlink data packet to the backhaul router 116 via the cellular network 120. On the other hand, if an associated uplink data packet was transported from the backhaul router 116 to the core network 104 via the independent relay network 138, then the routing module 410 may also use the independent relay network 138 to route a corresponding downlink data packet to the backhaul router 116.

The routing module 410 may package a downlink data packet that is to be transported to the cell site 102 via the cellular network 120 into a downlink data frame that includes an identifier of the backhaul router 116. Alternatively, a downlink data packet that is to be transported to the cell site 102 via the carrier-operated relay network 126 may be packaged into a downlink data packet that includes two identifiers (e.g., VLAN IDs in the form of IEEE 802.1Q conformant tags). The first identifier may be the identifier of the relay router 136, and the second identifier may be the identifier of the backhaul router 116. The use of such identifiers in a downlink data frame may ensure that the relay router 136 may remove the first identifier upon receiving the downlink data frame, so that the relay router 136 may use the second identifier to relay the downlink data frame to the backhaul router 116.

The downlink validation module 416 may be used by the routing module 410 to route a downlink data packet to the cell site 102 via an independent relay network, such as the independent relay network 138. The routing module 410 may have acquired a public IP address of a relay router associated with the relaying independent relay network, as well as a private IP address of a backhaul router that is suppose to receive the downlink data packet. The routing module 410 may have acquired such information from an uplink data packet that resulted in the downlink data packet. Accordingly, the routing module 410 may use the downlink validation module 416 to validate that the public IP address relay router is legitimate. The downlink validation module 416 may perform such validation using the binding table 422. For example, if the downlink validation module 416 determines that a table entry for the cell site 102 lists both the public IP of the relay router (e.g., the relay router 144) and the private IP address of the backhaul router (e.g., the backhaul router 116), then the public IP address of the relay router is valid. Accordingly, the routing module 410 may use the encryption module 418 to encrypt the downlink data packet into a downlink datagram. Otherwise, the routing module 410 may drop the downlink data packet.

The encryption module 418 may be used by the routing module 410 to encrypt a downlink data packet into a downlink datagram. Such encryption may be performed using a public key of an encryption certification, such the encryption certificate 222. The routing module 410 may also append a MPLS label that identifies the backhaul router associated with the cell site 102 to the downlink datagram. Subsequently, the routing module 410 may route the downlink datagram to the relay router of the cell site 102 via the independent relay network.

The data store 420 may store the binding table 422 and the encryption certificate 222. The binding table 422 may include data that enables the MSO server 112 to route downlink data packets to the backhaul router 116 via the independent relay network 138. Moreover, if the public IP address of the relay router 144 is updated, each of the binding tables 224, 334, and the 422 are to be updated to reflect the update. Accordingly, each of the backhaul router 116, relay router 144, and the MSO server 112 may include components that propagate the update from the relay router 144 to each of the binding tables. Further, while the MSO server 112 is illustrated in FIG. 4 as having the modules 408-418, the MSO server 112 may also include other software and hardware components that are commonly present in other routers. For example, such components may include components that provide a firewall function, a packet forwarding function, a proxy function, user interface functions, and/or so forth.

Example Operations

FIGS. 5-12 present illustrative processes 500-1200 for selectively offloading the transmission of backhaul data traffic between cell sites and a core network of a mobile telecommunication carrier from a cellular network to an alternative relay network. Each of the processes 500-1200 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 500-1200 are described with reference to the environment 100 of FIG. 1.

Figure 5:
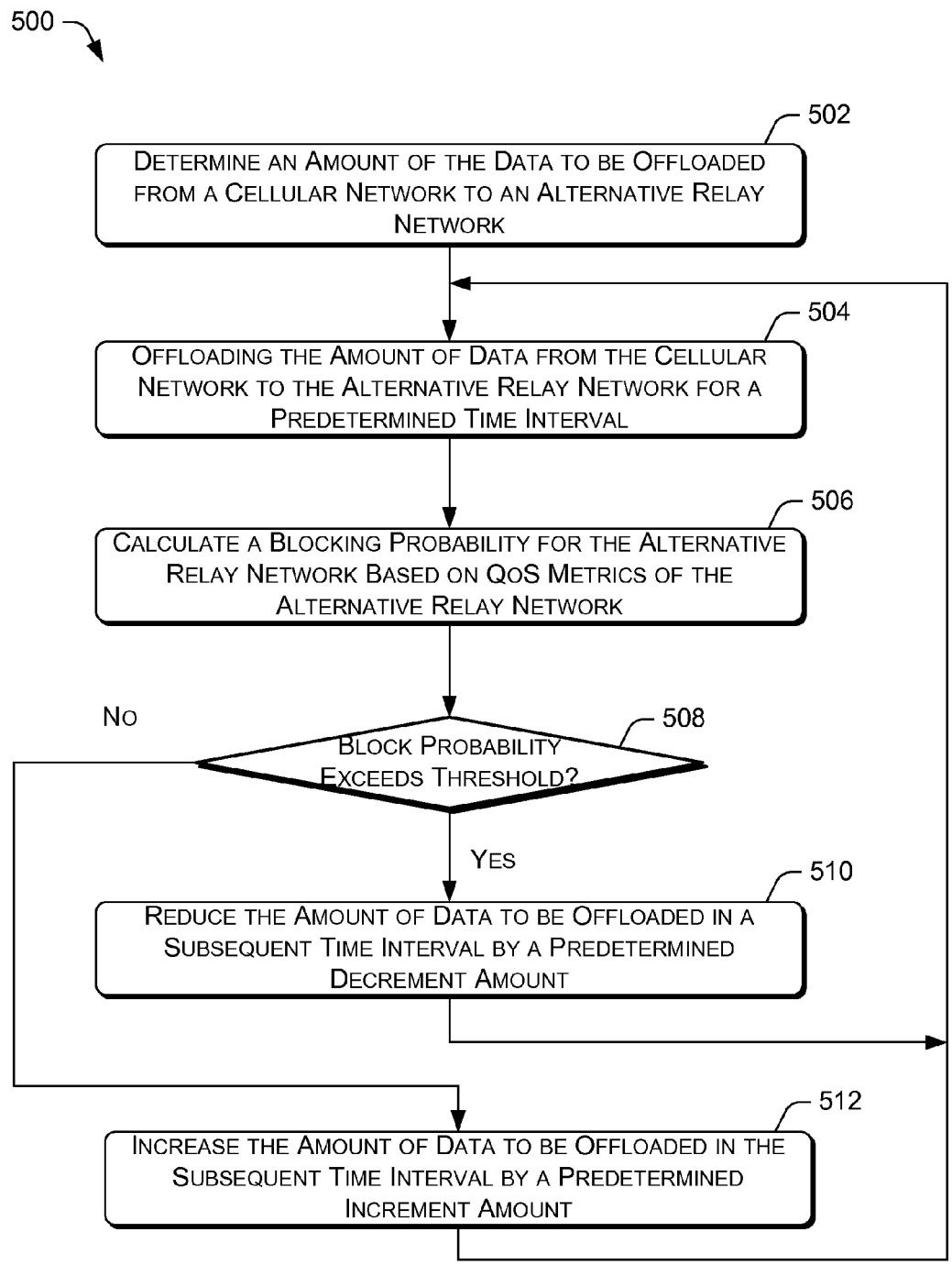
FIG. 5 shows a flow diagram of an example process for selectively allocating backhaul data traffic between a cellular network and an alternative relay network.

FIG. 5 shows a flow diagram of an example process 500 for selectively allocating backhaul data traffic between a cellular network and an alternative relay network. At block 502, the backhaul router 116 may determine an amount of data to be offloaded from the cellular network 120 to an alternative relay network based on the data class. The data may include uplink data packets that are being transported between the cell site 102 and the core network 104. The alternative relay network may be the carrier-operated relay network 126 or the independent relay network 138.

In various embodiments, the backhaul router 116 may make such a determination based on conditions of the cellular network 120 and the alternative relay network. The conditions may include the bandwidth capacity of the alternative relay network and the bandwidth availability of the alternative relay network. Alternatively or concurrently, the backhaul router 116 may also take into consideration the data class of the data that is to be relayed. The different classes of data may include voice data, network control data, non-real time streaming data, real-time streaming data, background data, best effort data, and/or so forth.

At block 504, the backhaul router 116 may offload the amount of data from the cellular network 120 to the alternative relay network for a predetermined time interval. The data that is offloaded may include uplink data packets that are destined for the MSO server 112 of the core network 104. The predetermined time interval may be a time period in which the backhaul router 116 offloads uplink data packets to a relay router, such as one of the relay router 136 or the relay router 144.

At block 506, the backhaul router 116 may calculate a block probability for the alternative relay network based on the QoS metrics of the alternative relay network. In various embodiments, the QoS metrics may include data throughput, packet drop rate, transmission error rate, latency, jitter, and/or so forth.

At decision block 508, the backhaul router 116 may determine whether the blocking probability exceeds a predetermined threshold. Thus, if the backhaul router 116 determines that the blocking probability exceeds the predetermined blocking threshold ("yes" at decision block 508), the process 500 may proceed to block 510. At block 510, the backhaul router 116 may reduce the amount of data to be offloaded in a subsequent time interval by a predetermined decrement amount. In some embodiments, the amount of reduction in the amount of data to be offloaded may be limited by a minimal threshold amount, so that at least some amount of data is always offloaded by the backhaul router 116 from the cellular network 120 to the alternatively relay network. Subsequently, the process 500 may loop back to block 504, so that the data may be offloaded for another time interval.

However, if the backhaul router 116 determines that the blocking probability does not exceed the predetermined blocking threshold ("no" at decision block 508), the process 500 may proceed to block 512. At block 512, the backhaul router 116 may increase the amount of data to be offloaded in the subsequent time interval by a predetermined increment amount. In some embodiments, the amount of increment may be limited by a maximum threshold amount, in which the maximum threshold amount is less than or equal to the amount that is being routed between the cell site 102 and the core network 104. Subsequently, the process 500 may loop back to block 504, so that the data may be offloaded for another time interval.

Figure 6:
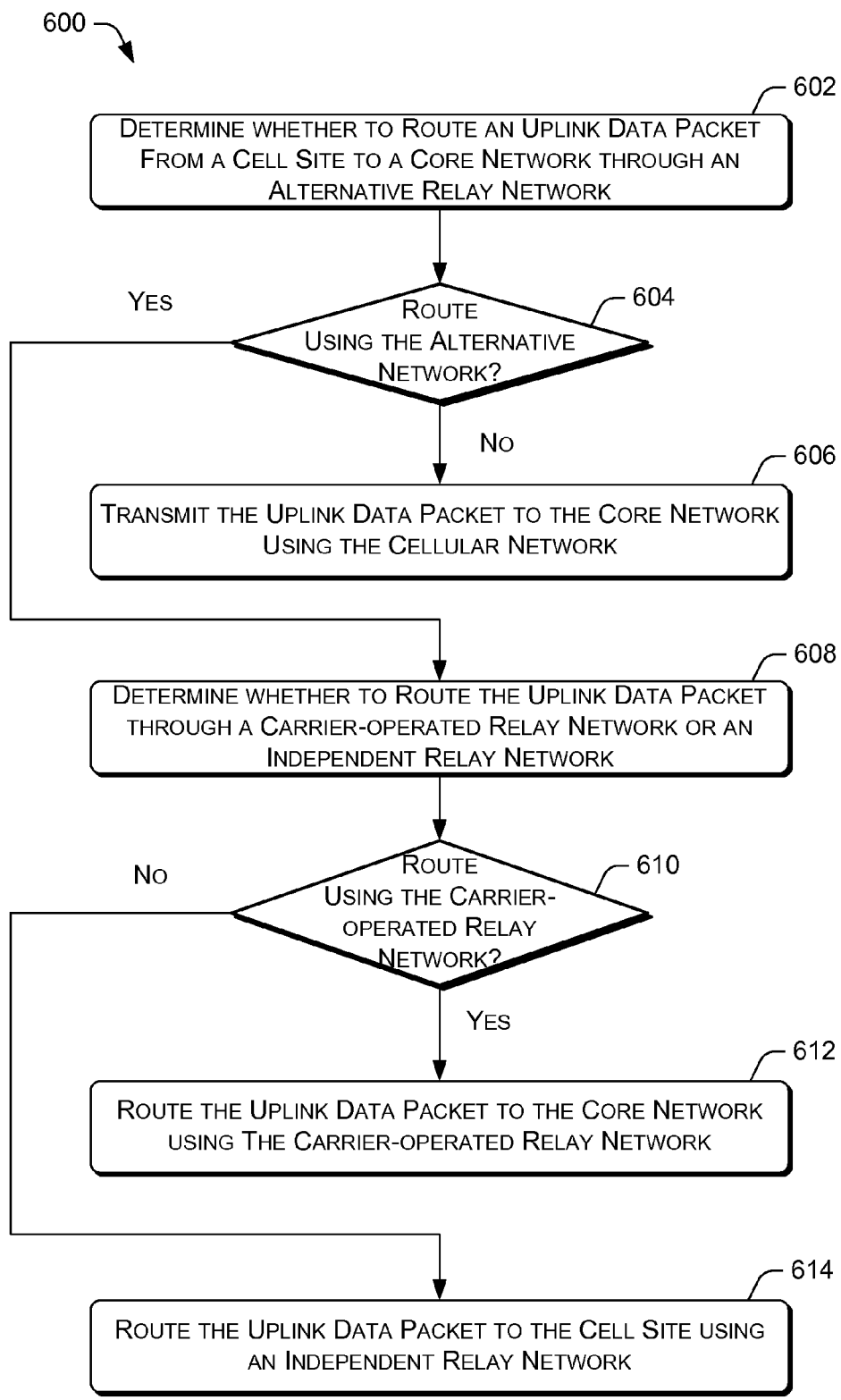
FIG. 6 shows a flow diagram of an example process for selecting a network for routing an uplink data packet from a cell site to a core network.

FIG. 6 shows a flow diagram of an example process 600 for selecting a network for routing an uplink data packet from a cell site to a core network. At block 602, the backhaul router 116 may determine whether to route an uplink data packet from the cell site 102 to the core network 104 through an alternative relay network. In various embodiments, the backhaul router 116 may use at least a portion of the process 500 of FIG. 5 to make the determination with respect to the routing of the uplink data packet.

At decision block 604, if the backhaul router 116 determines that no alternative relay network is to be used ("no" at decision block 604), the process 600 may proceed to block 606. At block 606, the backhaul router 116 may transmit the uplink data packet to the core network 104 using the cellular network 120. However, if the backhaul router 116 determines that an alternative relay network is to be used ("yes" at decision block 604), the process 600 may proceed to block 608.

At block 608, the backhaul router 116 may determine whether to route the uplink data packet through the carrier-operated relay network 126 or the independent relay network 138. In various embodiments, the backhaul router 116 may use at least a portion of the process 500 of FIG. 5 to make the determination with respect to the routing of the uplink data packet.

At decision block 610, if the backhaul router 116 determines that the uplink data packet is to be routed through the carrier-operated relay network 126 ("yes" at decision block 610), the process 600 may proceed to block 612. At block 612, the backhaul router 116 may route the uplink data packet to the core network 104 using the carrier-operated relay network 126.

However, if the backhaul router 116 determines at decision block 610 that the uplink data packet is not to be routed through the carrier-operated relay network 126 ("no" at decision block 610), the process 600 may proceed to block 614. At block 614, the backhaul router 116 may route the uplink data packet to the core network 104 using the independent relay network 138.

Figure 7:
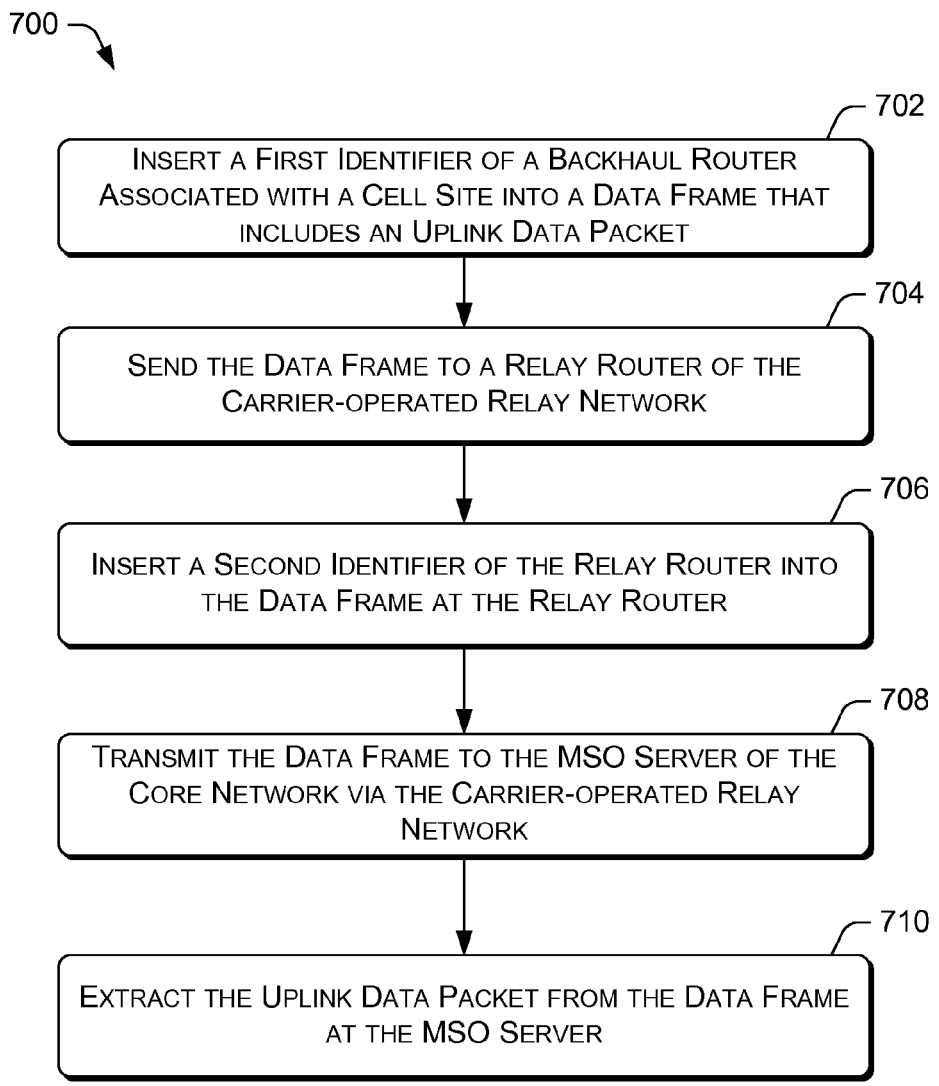
FIG. 7 shows a flow diagram of an example process for routing an uplink data packet using a carrier-operated relay network.

FIG. 7 shows a flow diagram of an example process 700 for routing an uplink data packet using the carrier-operated relay network 126. The process 700 may further illustrate the block 610 of the process 600.

At block 702, the backhaul router 116 may insert a first identifier into an uplink data frame that includes the uplink data packet. The first identifier may be the identifier of the backhaul router 116 that is associated with the cell site 102. The uplink data packet may be a data packet that is to be transported from the cell site 102 to the core network 104. The first identifier may be a VLAN ID (e.g., IEEE 802.1Q conformant tag).

At block 704, the backhaul router 116 may send the uplink data frame to the relay router 136 of the carrier-operated relay network 126. In various embodiments, the uplink data frame may be sent via a Wi-Fi link, a WiMax link, a microwave link, a satellite data link, and/or so forth.

At block 706, the relay router 136 may insert a second identifier into the uplink data frame that includes the uplink data packet. The second identifier may be the identifier of the relay router 136. The first identifier may be a VLAN ID (e.g., IEEE 802.1Q conformant tag).

At block 708, the relay router 136 may transmit the uplink data frame to the core network 104 via the carrier-operated relay network 126. In various embodiments, the relay router 136 may transmit the uplink data frame to the MSO server 112 of the core network 104.

At block 710, the MSO server 112 of the core network 104 may extract the uplink data packet from the uplink data frame. Once the uplink data packet is extracted, the MSO server 112 may route the uplink data packet to a component in the core network 104 that processes the uplink data packet. Alternatively, the MSO server 112 may package the uplink data packet in another uplink data frame for transport to another component that is outside of the core network 104.

Figure 8:
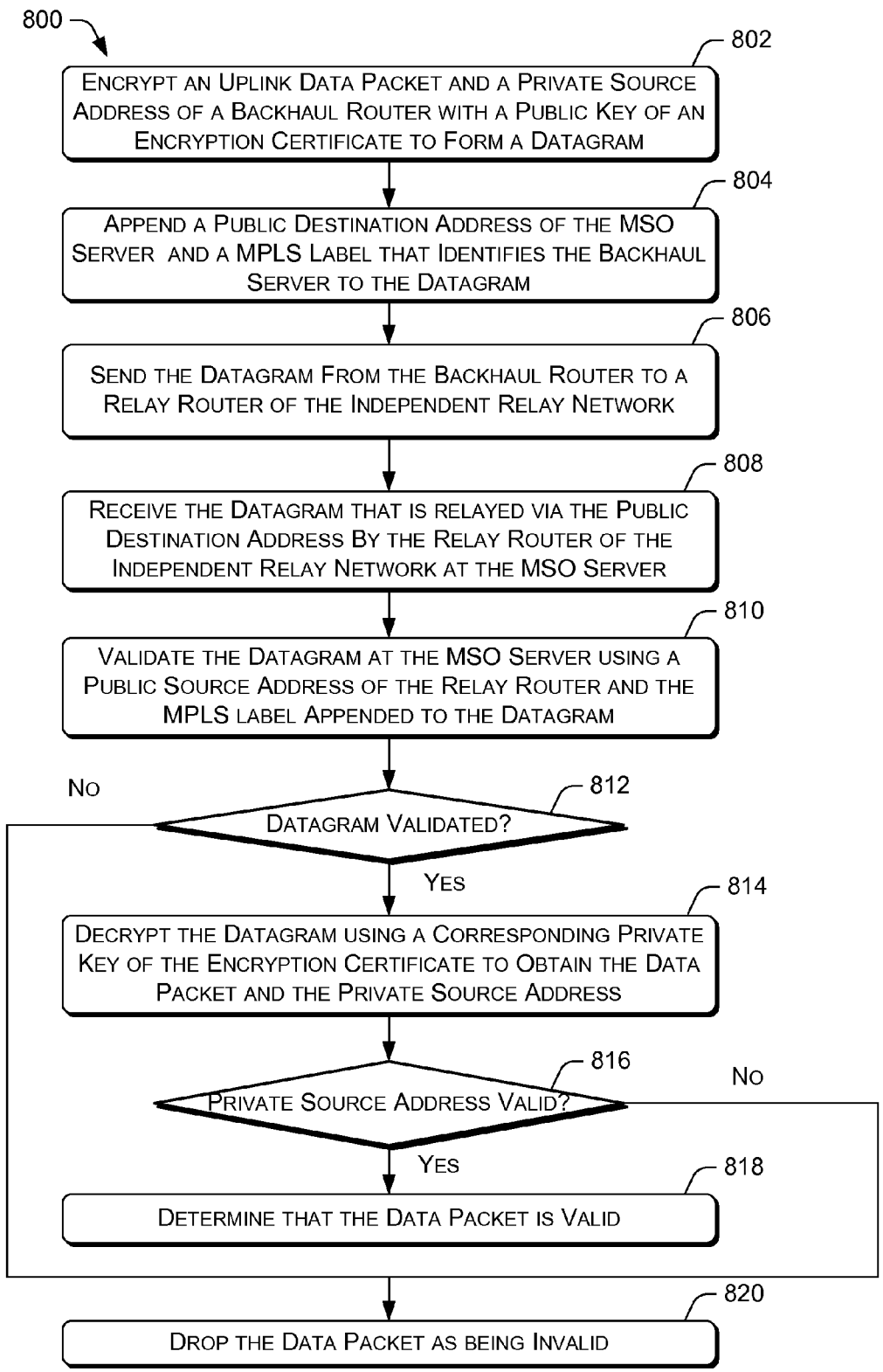
FIG. 8 shows a flow diagram of an example process for routing an uplink data packet using an independent relay network.

FIG. 8 shows a flow diagram of an example process 800 for routing an uplink data packet using the independent relay network 138. The process 800 may further illustrate the block 612 of the process 600.

At block 802, the backhaul router 116 may encrypt an uplink data packet and a private source address of the backhaul router 116 with a public key of the encryption certificate 222 to form a datagram. The backhaul router 116 may be associated with the cell site 102, and the uplink data packet may be destined to be transported from the cell site 102 to the core network 104. At block 804, the backhaul router 116 may append a public destination address of the MSO server 112 and a MPLS label to the uplink datagram. The MPLS label may identify the backhaul router as the originator of the datagram.

At block 806, the backhaul router 116 may send the datagram to the relay router 144 of the independent relay network 138. In this way, the relay router 144 may transport the datagram to the MSO server 112 of the core network 104 via the independent relay network 138. In various embodiments, the datagram may be sent via a Wi-Fi link, a WiMax link, a microwave link, a satellite data link, and/or so forth.

At block 808, the MSO server 112 may receive the datagram as sent by the relay router 144. The relay router 144 may have used the public destination address of the MSO server 112 to relay the datagram to the MSO server 112. In various embodiments, the relay router 144 may attach a public source address of the relay router 144 to the datagram when sending the datagram to the MSO server 112.

At block 810, the MSO server 112 may validate the datagram using the public source address of the relay router 144 and the MPLS Label as appended to the datagram. In various embodiments, the MSO server 112 may consider the public source address valid when the public source address is a public IP address of a registered relay router (e.g., relay router 144) that is stored in a binding table entry in the binding table 422. Further, the uplink validation module 412 may consider the MPLS label valid when the MPLS label identifies an associated backhaul router (e.g., backhaul router 116) that is capable of routing data packets to the registered relay router, as indicated by the same table entry in the binding table 422.

Accordingly, if the MSO server 112 determines that the datagram is valid ("yes" at decision block 812), the process 800 may proceed to block 814. At block 814, the MSO server 112 may decrypt the datagram using a corresponding private key of the encryption certificate 222, so as to obtain the uplink data packet and the private source address that was encrypted into the datagram.

At decision block 816, the MSO server 112 may determine whether the private source address that was decrypted from the datagram is valid. In various embodiments, the MSO server 112 may consider the decrypted private source address valid when the decrypted private source address matches a private source address listed in the table entry of the binding table 422 that is previously used to validate the corresponding uplink datagram.

Accordingly, if the MSO server 112 determines that the private source address is valid ("yes" at decision block 816), the process 800 may proceed to block 818. At block 818, the MSO server 112 may determine that the decrypted uplink data packet that is also included in the datagram is valid. Subsequently, the MSO server 112 may route the uplink data packet to a component in the core network 104 that processes the uplink data packet. Alternatively, the MSO server 112 may package the uplink data packet in another uplink data frame for transport to another component that is outside of the core network 104.

Returning to decision block 812, if the MSO server 112 determines that the datagram is not valid ("no" at decision block 812), the process 800 may proceed to block 820. At block 820, the MSO server 112 may drop the data packet as being invalid. Likewise, returning to decision block 816, if the MSO server 112 determines that the private source address is invalid ("no" at decision block 816), the process 800 may also proceed to block 820. Once again, the MSO server 112 may drop the data packet as being invalid at block 820.

Figure 9:
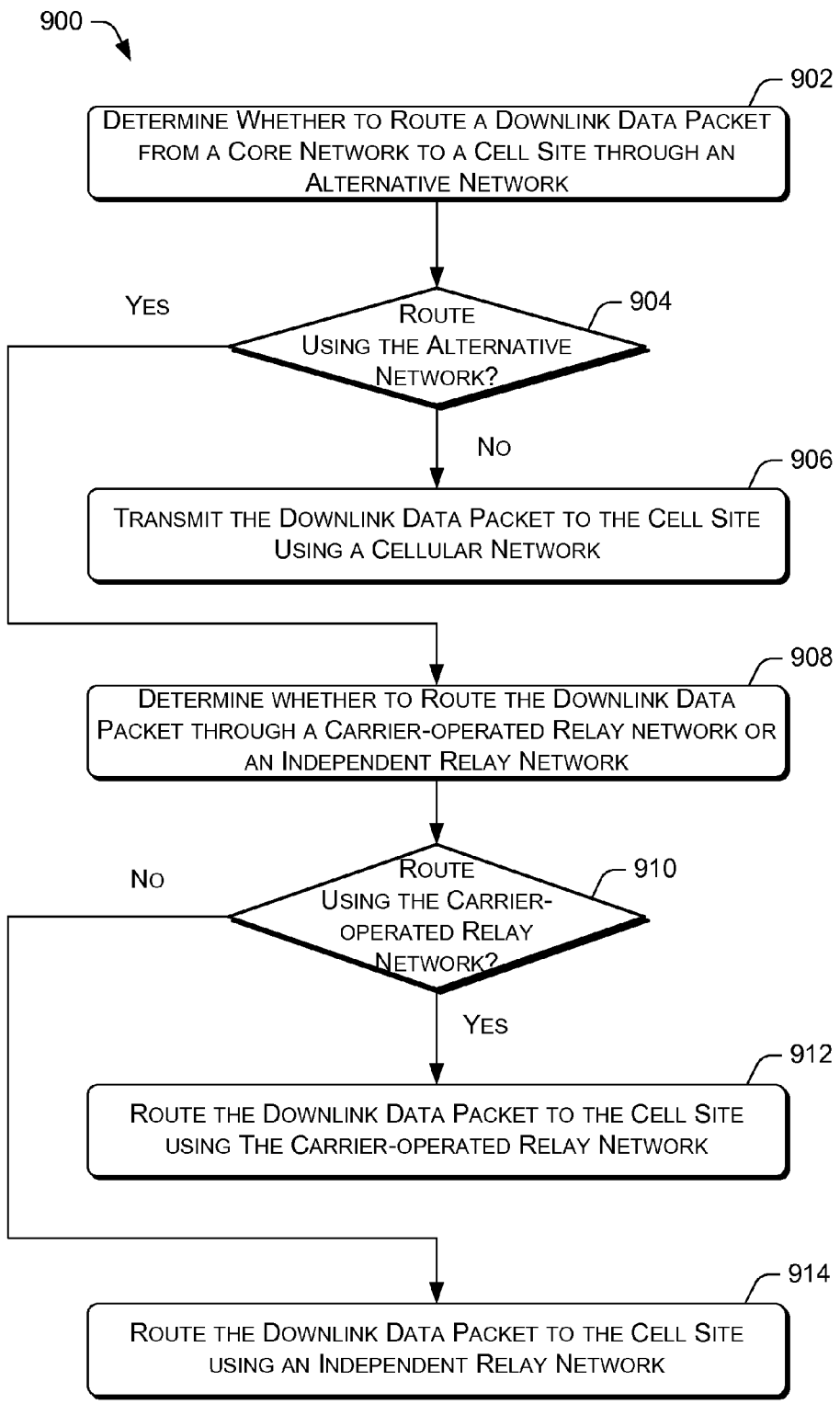
FIG. 9 shows a flow diagram of an example process for selecting a network for routing a downlink data packet from a core network to a cell site.

FIG. 9 shows a flow diagram of an example process 900 for selecting a network for routing a downlink data packet from a core network to a cell site. At block 902, the MSO server 112 may determine whether to route a downlink data packet from the core network 104 to the cell site 102 through an alternative relay network. In various embodiments, the backhaul router 116 may make such a determination based on the identity of the network used by a corresponding uplink data packet that resulted in the downlink data packet.

At decision block 904, if the MSO server 112 determines that no alternative relay network is to be used to transport the downlink data packet ("no" at decision block 904), the process 900 may proceed to block 906.

At block 906, the MSO server 112 may transmit the downlink data packet to the cell site 102 using the cellular network 120. In various embodiments, the backhaul router 116 that is associated with the cell site 102 may receive the downlink data packet. The backhaul router 116 may further deliver the downlink data packet to the cell site 102.

However, if the MSO server 112 determines that an alternative relay network is to be used to transport the downlink data packet ("yes" at decision block 904), the process 900 may proceed to block 908.

At block 908, the MSO server 112 may determine whether to route the uplink data packet through the carrier-operated relay network 126 or the independent relay network 138. In various embodiments, the backhaul router 116 may make such a determination based on the identity of the network used by a corresponding uplink data packet that resulted in the downlink data packet.

At decision block 910, if the MSO server 112 determines that the downlink data packet is to be routed through the carrier-operated relay network 126 ("yes" at decision block 910), the process 900 may proceed to block 012. At block 912, the MSO server 112 may route the downlink data packet to the backhaul router 112 of the cell site 102 using the carrier-operated relay network 126.

However, if the MSO server 112 determines at decision block 910 that the uplink data packet is not to be routed through the carrier-operated relay network 126 ("no" at decision block 910), the process 900 may proceed to block 914. At block 914, the MSO server 112 may route the downlink data packet to the backhaul router 112 of the cell site 102 using the independent relay network 138.

Figure 10:
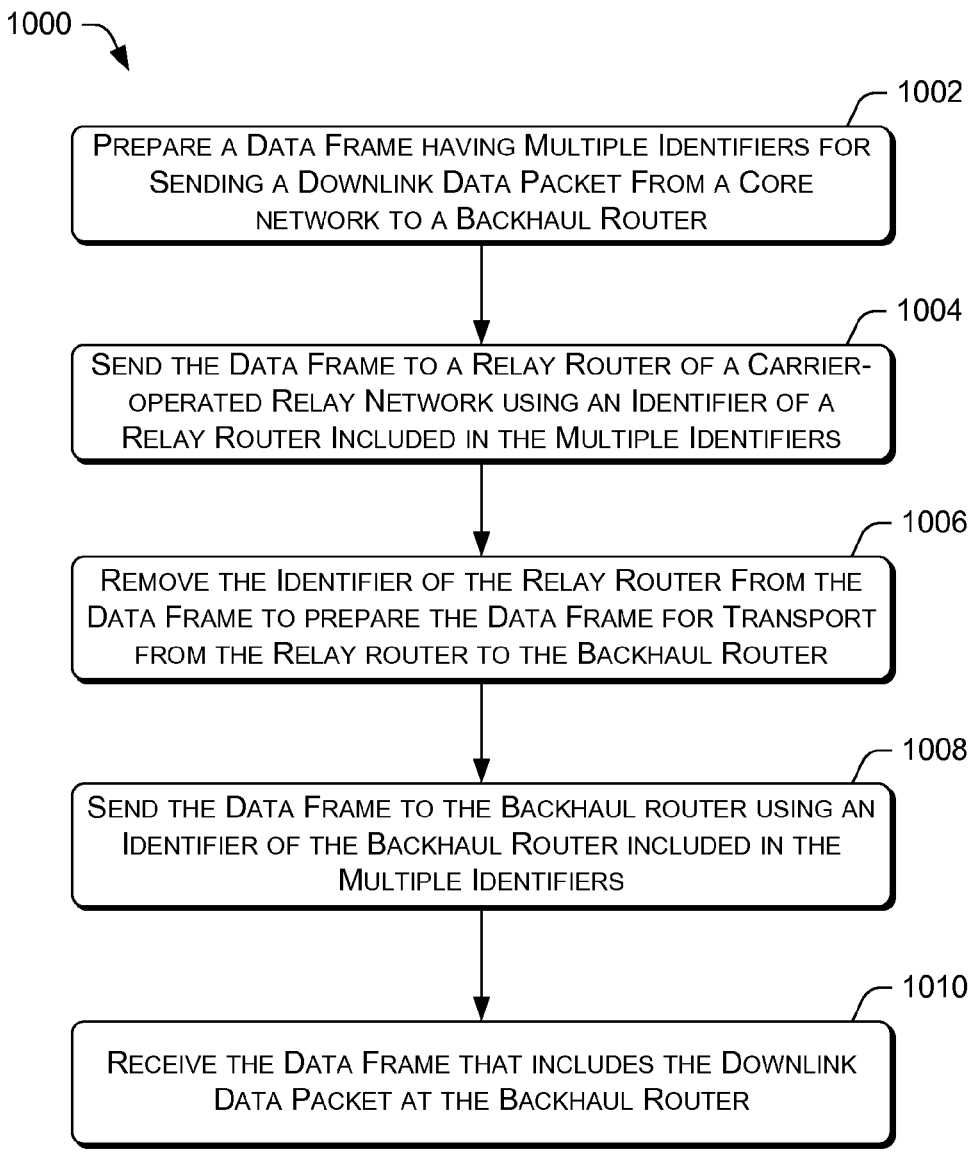
FIG. 10 shows a flow diagram of an example process for routing a downlink packet using a carrier-operated relay network.

FIG. 10 shows a flow diagram of an example process 1000 for routing a downlink packet using a carrier-operated relay network. The process 1000 may further illustrate the block 910 of the process 900.

At block 1002, the MSO server 112 may prepare a downlink data packet for sending from the core network 104 to the backhaul router 116 of the cell site 102. In various embodiments, the MSO server 112 may encapsulate the downlink data packet in a downlink data frame that includes multiple identifiers. The first identifier included in the multiple identifiers may be an identifier of the relay router 136. The second identifier included in the multiple identifiers may be an identifier of the backhaul router 116. The multiple identifiers may be VLAN IDs (e.g., IEEE 802.1Q conformant tags).

At block 1004, the MSO server 112 may send the downlink data frame to the relay router 136 of the carrier-operated relay network 126 using the first identifier that is included in the multiple identifiers.

At block 1006, the relay router 136 may receive the downlink data frame. Subsequently, the relay router 136 may remove the first identifier that is the identifier of the relay router from the downlink data frame. In this way, the relay router 136 may prepare the downlink data frame for transport from the relay router 136 to the backhaul router 116.

At block 1008, the relay router 136 may send the downlink data frame to the backhaul router 116 using the second identifier included in the multiple identifiers that are the identifier of the backhaul router 116.

At block 1010, the backhaul router 116 may receive the downlink data frame that includes the downlink data packet. Subsequently, the backhaul router 116 may send the downlink data packet to the cell site 102. In various embodiments, the cell site 102 may further send the downlink data packet to a communication device, such as the communication device 108.

Figure 11:
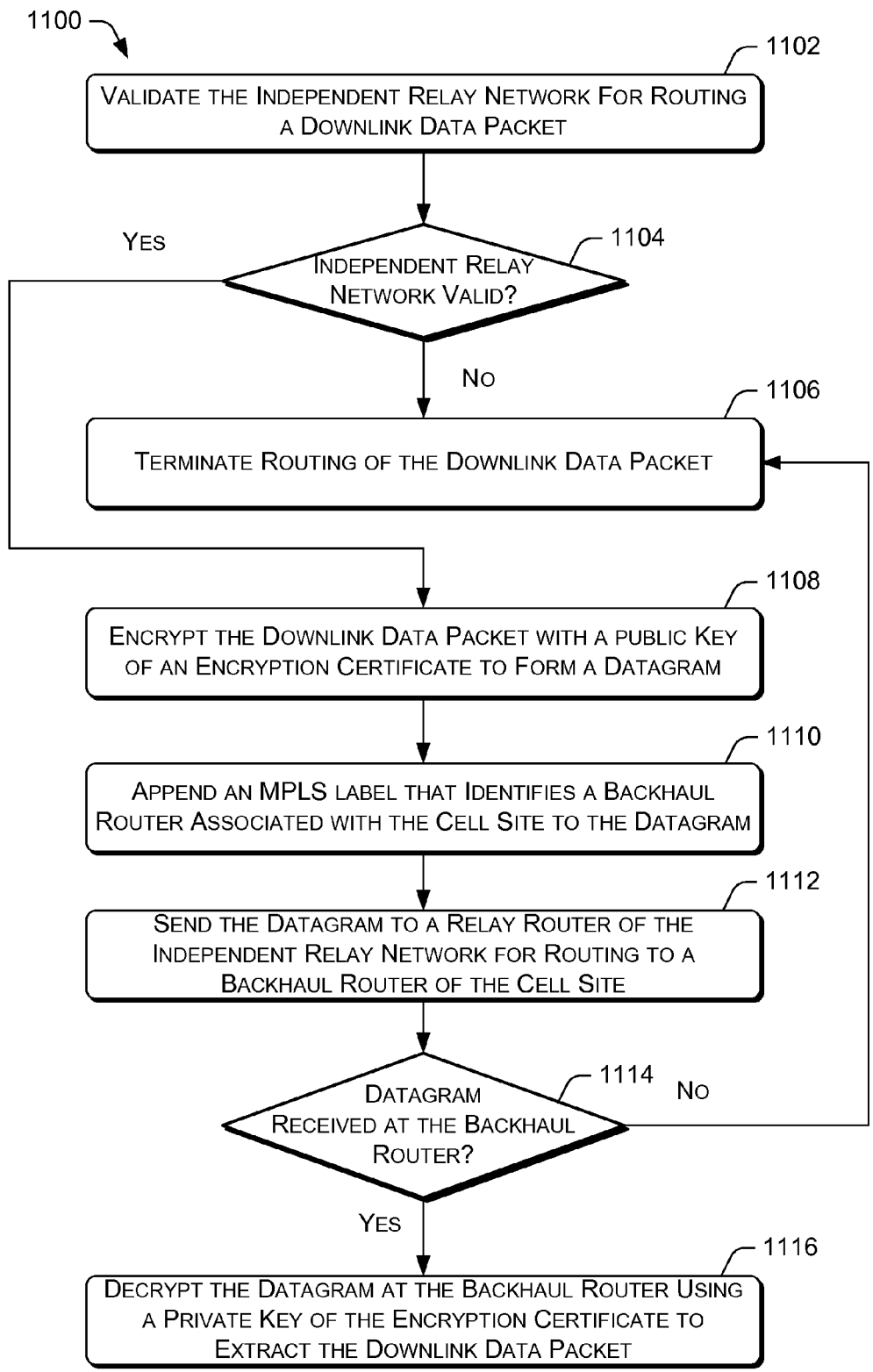
FIG. 11 shows a flow diagram of an example process for routing a downlink packet using an independent relay network.

FIG. 11 shows a flow diagram of an example process 1100 for routing a downlink packet using the independent relay network 138. The process 1100 may further illustrate the block 912 of the process 900.

At block 1102, the MSO server 112 may validate the independent relay network 138 for routing a downlink data packet from the core network 104 to the backhaul router 116 of the cell site 102. In various embodiments, the validation may be performed by verifying that a public IP address of the relay router 144 associated with the independent relay network 138 is registered in the binding table 422. Thus, the independent relay network 138 is considered valid when the public IP address is included in the binding table 422. In additional embodiments, the MSO server 112 may also verify that the QoS metrics associated with the independent relay network 138 meet predetermined thresholds. The QoS metrics may include data throughput, packet drop rate, transmission error rate, latency, jitter, and/or so forth. Accordingly, the MSO server 112 may consider the independent relay network 138 as valid when all of the QoS metrics meet their respective predetermined thresholds.

At decision block 1104, if the MSO server 112 determines that that the independent relay network 138 is not valid ("no" at decision block 1104), the process 1100 may proceed to block 1106. At block 1106, the MSO server 112 may terminate routing of the downlink data packet to the backhaul router 114 of the cell site 102. However, in embodiments in which the independent relay network 138 is found to be invalid solely based on the failure to meet one or more QoS metrics, the MSO server 112 may retry the routing of the downlink data packet at a later time.

However, if the MSO server 112 determines that the independent relay network 138 is valid ("yes" at decision block 1104), the process 1100 may proceed to block 1108. At block 1108, the MSO server 112 may encrypt the downlink data packet with a public key of the encryption certificate 222 to form a downlink datagram.

At block 1110, the MSO server 112 may append a MPLS label that identifies the backhaul router 116 to the datagram. The MPLS label may be used by the relay router 144 of the independent relay network 138 to route the downlink datagram to the backhaul router 116.

At block 1110, the MSO server 112 may send the downlink datagram to the relay router 144 of the independent relay network 138. Upon receiving the downlink datagram, the relay router 144 may check the MPLS label against its binding table 332 to identify a private destination IP address for the backhaul router 116. The relay router 144 may then use the private destination IP address to route the downlink data packet to the backhaul router 116. However, if the relay router 144 is unable to identify a private destination IP address based on the MPLS label, the relay router 144 may drop the downlink datagram as invalid.

At decision block 1114, the backhaul router 116 may determine whether it has received the downlink datagram. If the downlink datagram was not received by the backhaul router 116 ("no" at decision block 1114), it may mean that that the routing of the downlink data packet has been terminated by the relay router 144 of the independent relay network 138. However, if the downlink datagram was received by the backhaul router 116 ("yes" at decision block 1114), the process 1100 may proceed to block 1116.

At block 1116, the backhaul router 116 may decrypt the downlink datagram using a private key of the encryption certificate 222. Accordingly, the backhaul router 116 may extract the downlink data packet from the downlink datagram. Subsequently, the backhaul router 116 may send the downlink data packet to the cell site 102. In various embodiments, the cell site 102 may further send the downlink data packet to a communication device, such as the communication device 108.

Figure 12:
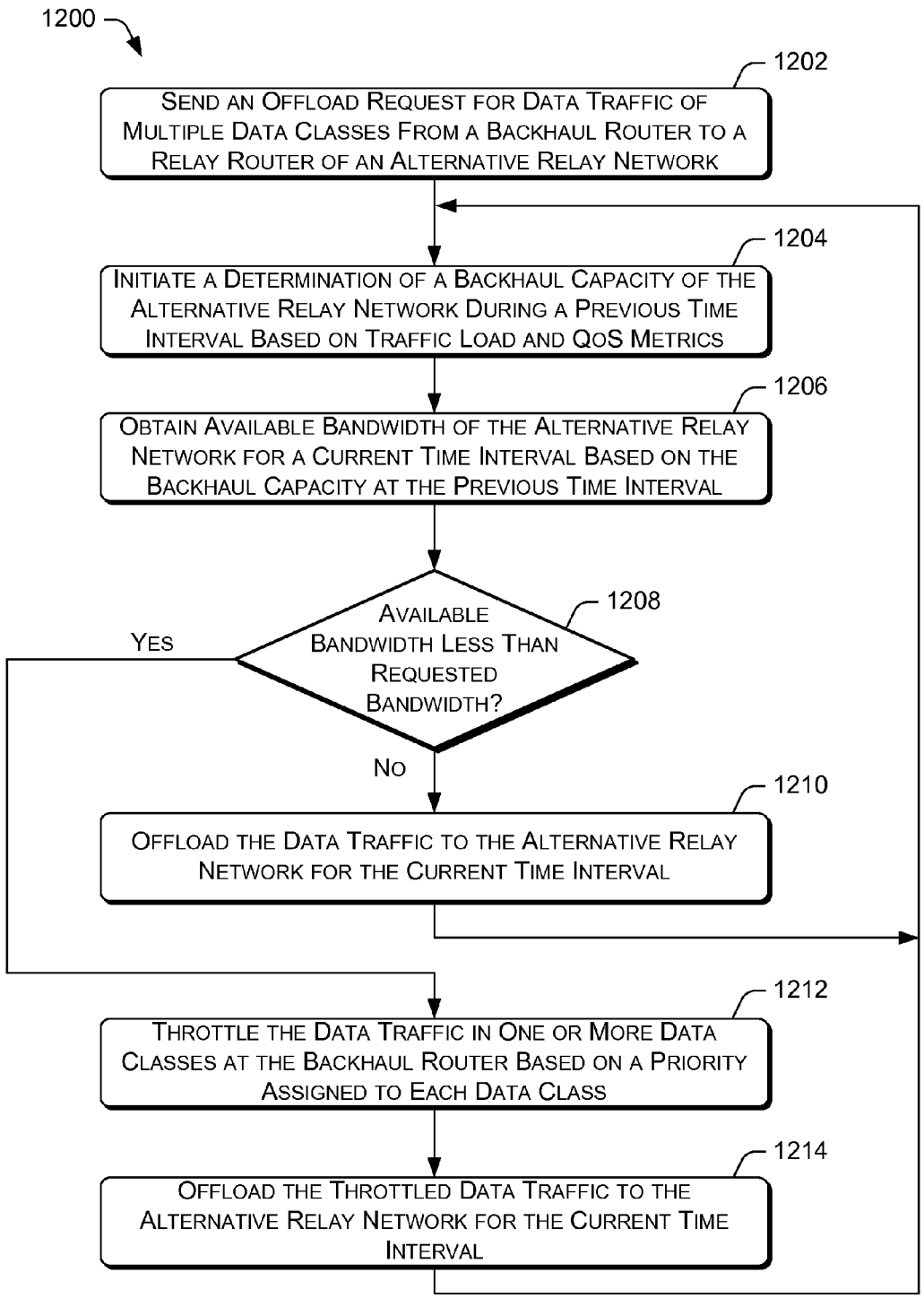
FIG. 12 shows a flow diagram of an example process for selectively throttling backhaul data traffic to be offloaded to an alternative relay network based on a priority assigned to each data class of data in the backhaul data traffic.

FIG. 12 shows a flow diagram of an example process 1200 for selectively throttling backhaul data traffic to be offloaded to an alternative relay network based on a priority assigned to each data class of data in the backhaul data traffic.

At block 1202, the backhaul router 116 may send an offload request to a relay router of an alternative relay network for data traffic to be offloaded from the cellular network 120 to the alternative relay network. The offload request may specify a requested bandwidth for carrying the offloaded data traffic. The data traffic to be offloaded may include data of multiple data classes. For example, the multiple data classes may include voice data, network control data, non-real time streaming data, real-time streaming data, background data, best effort data, and/or so forth. Further, the data traffic to be offloaded may include uplink data packets that are being transported between the cell site 102 and the core network 104. The alternative relay network may be the carrier-operated relay network 126 or the independent relay network 138. The offload request may be sent by routing control module 210 of the backhaul router 116.

At block 1204, the offload request may initiate a determination of a backhaul capacity of the alternative relay network by the relay router of the alternative relay network for a previous time interval. In various embodiments, the relay router may determine the backhaul capacity of the previous time interval based on traffic load of the alternative relay network during the previous time interval and QoS metrics associated with the alternative relay network. For example, the QoS metrics may include data throughput, packet drop rate, transmission error rate, latency, jitter, and/or so forth. In this way, the relay router of the alternative relay network may estimate an available bandwidth for a current time interval based at least on the determine backhaul capacity of the alternative relay network during the previous time interval. For example, the available bandwidth of the alternative relay network for the current time interval may be the backhaul capacity during the previous time interval, as modified by an upcoming increase or decrease in overall network bandwidth capacity and/or an upcoming increase or decrease in non-backhaul data traffic.

At block 1206, the backhaul router 116 may obtain the available bandwidth of the alternative relay network for the current time interval, as determined by the relay router based at least on the determine backhaul capacity of the alternative relay network during the previous time interval. In various embodiments, the routing control module 210 of the backhaul router 116 may obtain such information through a data communication with the relay router.

At decision block 1208, the backhaul router 116 may determine whether the available bandwidth of the relay network for the current time interval is less than a bandwidth requested by the backhaul router 116 to offload the data traffic to the alternative relay network for the current time interval. Thus, if the backhaul router 116 determines that the available bandwidth is not less than the requested bandwidth ("no" at decision block 1208), the process may proceed to block 1210. For example, the available bandwidth may be equal to or greater than the requested bandwidth for the current time interval. At block 1210, the backhaul router 116 may offload the data traffic to the alternative relay network for the current time interval. Subsequently, the process 1200 may loop back to 1204, so that another determination of the backhaul capacity of the alternative relay network may be made.

However, returning to decision block 1208, if the backhaul router 116 determines that the available bandwidth is less than the requested bandwidth for the current interval ("yes" at decision block 1208), the process 1200 may proceed to block 1212.

At block 1212, the backhaul router 116 may throttle the data traffic that is in one or more classes based on a priority assigned to each data class. In other words, data of different data classes in the data traffic may be incrementally and sequentially dropped, i.e., not offloaded, according to their assigned priorities so that the total amount of requested bandwidth is equal to the available bandwidth of the alternative relay network for the current time interval.

For example, given that there are two classes of data in the data traffic to be offloaded in a time interval: 4 megabytes (MB) of voice data and 2 MB of background data, in which voice data has a higher assigned priority than the background data. Thus, if the available bandwidth of the alternative relay network is 5 MB for the time interval, then one MB of the background data may be dropped by the backhaul router 116. However, if the available bandwidth of the alternative relay network is 4 MB for the time interval, then the entire 2 MB of background data may be dropped rather than offloaded. In another scenario in which the available bandwidth for the time interval is 2 MB, then the backhaul router 116 may drop the entire 2 MB of background data and also drop 2 MB of the voice data. While the above example is given with respect to two classes of data in the offloaded data traffic, the incremental and sequential drop of data in the data traffic for other multiple classes of data (e.g., three classes, four classes, etc.) may be carried out in a similar fashion. The incremental and sequential drop of data in the data traffic according to priorities assigned to the data classes of the data by the backhaul router 116 may form throttled data traffic. The backhaul router 116 may send any dropped data in a subsequent time interval using the same alternative relay network, or divert the dropped data to another network for transmission to the MSO server 112. The throttling of data traffic in this manner may serve to ensure that the offloading of data in a higher priority data class is preserved over the offloading of data in a lower priority data class, so that the transport of vital data may be protected at the expense of less important data.

At block 1214, the backhaul router 116 may offload the throttled data traffic to the alternative relay network for the current time interval. Subsequently, the process 1200 may loop back to block 1204, so that another determination of the backhaul capacity of the alternative relay network may be made.

In some embodiments, the routing module 410 of the MSO server 112 may perform a process that is similar to the process 1200 while using an alternative relay network to transfer downlink data traffic from the core network 104 to the backhaul router 116. Thus, by selectively offloading backhaul data traffic between cell sites and the core network to existing alternative relay networks, a mobile telecommunication carrier may increase available backhaul bandwidth to meet higher data traffic demands without adding additional network infrastructure. Further, since offloading of the backhaul data traffic to an alternative relay network is performed based on bandwidth and QoS considerations, the distribution of the backhaul data traffic may maintain high quality service regardless of whether the cellular network or the alternative relay network is used.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

I claim:

1. A non-transitory computer-readable medium storing computer-executable instructions that, when executed, cause one or more processors to perform acts comprising:
   offloading a transmission of an amount of data between a cell site and a core network from a cellular network to an alternative relay network for a predetermined time interval;
   calculating a blocking probability for the alternative relay network based on quality of service metrics of the alternative relay network;
   reducing the amount of data to be offloaded in a subsequent time interval by a decrement amount to produce an adjusted amount of data in response to determining that the blocking probability exceeds a threshold; and
   increasing the amount of data to be offloaded in a subsequent time interval by a an increment amount to produce the adjusted amount of data in response to determining that the blocking probability does not exceed the threshold,
   wherein the offloading includes transmitting the amount of data between a first transceiver of the cell site and a second transceiver of the alternative relay network via a wireless link.

2. The non-transitory computer-readable medium of claim 1, further comprising offloading the adjusted amount of data from the cellular network to the alternative relay for the subsequent time interval.

3. The non-transitory computer-readable medium of claim 1, wherein the wireless link comprises at least one of a Wi-Fi link, a WiMax link, a microwave link, or a satellite data link.

4. The non-transitory computer-readable medium of claim 1, wherein the offloading includes:
sending an offload request for data traffic of multiple data classes from a backhaul router of the cellular network to a relay router of the alternative relay network, the offload request specifying a requested bandwidth;
obtaining available bandwidth of the alternative relay network for a current time interval based at least on a backhaul capacity of the alternative relay network in a previous time interval, the backhaul capacity being derived from traffic load and the quality of service metrics of the alternative relay network during the previous time interval;
throttling the data traffic in one or more data classes based on a priority assigned to each of the multiple data classes in response to determining that the available bandwidth is less than the requested bandwidth; and
offloading the data traffic to the alternative relay network for the current time interval.

5. The non-transitory computer-readable medium of claim 1, wherein the amount of data that is offloaded from the cellular network to the alternative relay network is determined based on at least one of a bandwidth capacity of the alternative relay network, a bandwidth availability of the alternative relay network, or a data class of the data.

6. The non-transitory computer-readable medium of claim 1, wherein the data belongs to one of a voice data class, a network control data class, a non-real time streaming data class, a real-time streaming data class, a background data class, and a best effort data class, and wherein the quality of service metrics includes data throughput, packet drop rate, transmission error rate, latency, jitter of the alternative relay network.

7. The non-transitory computer-readable medium of claim 1, wherein the alternative relay network is a relay network that is operated by a mobile carrier that operates the cellular network or an independent relay network that operates independently from the mobile carrier.

8. The non-transitory computer-readable medium of claim 1, wherein the offloading includes sending an uplink data packet from the cell site to the core network or sending a downlink data packet from the core network to the cell site via the alternative relay network.

9. The non-transitory computer-readable medium of claim 8, wherein the sending the uplink data packet includes:
inserting a first identifier of a backhaul router associated with the cell site into an uplink data frame that includes the uplink data packet;
sending the data frame to a relay router of the alternative relay network and adding a second identifier of the relay router to the uplink data frame; and
transmitting the uplink data frame to a server of the core network using the second identifier for extraction of the uplink data packet from the uplink data frame by the server.

10. The non-transitory computer-readable medium of claim 8, wherein the sending the uplink data packet includes:
encrypting the uplink data packet with a public key of an encryption certificate to form an uplink datagram;
appending a public destination address of a server of the core network and a transfer label that identifies a backhaul router associated with the cell site to the uplink datagram; and
sending the uplink datagram from the backhaul router to the server of the core network via a relay router of the alternative relay network for decryption of the uplink data packet from the uplink datagram by the server using a private key of the encryption certificate.

11. The non-transitory computer-readable medium of claim 8, wherein the sending the downlink data packet includes:
encapsulating the downlink data packet in a downlink data frame that includes multiple identifiers, the multiple identifiers including a first identifier belonging to a relay router of the alternative relay network and a second identifier of a backhaul router associated with the cell site;
sending the data frame to the relay router of the alternative relay network using the first identifier; and
removing the first identifier from the downlink data frame at the relay router such that the relay router uses the second identifier to route the downlink data packet to the backhaul router associated with the cell site.

12. The non-transitory computer-readable medium of claim 8, wherein the sending the downlink data packet includes:
validating that each quality of service metric of the alternative relay network meets a corresponding threshold and that a relay router of the alternative relay network is a registered router;
encrypting the downlink data packet with a public key of an encryption certificate to form a downlink datagram;
appending a transfer label that identifies a backhaul router associated with the cell site to the downlink datagram; and
sending the downlink datagram to the relay router of the alternative relay network such that the relay router uses the transfer label to route the downlink datagram to the backhaul router for decryption of the downlink data packet using a private key of the encryption certificate.

13. A computer-implemented method, comprising:
determining that a transmission of an uplink data packet from a cell site to a core network is to be offloaded from a cellular network to an alternative relay network based on at least one of a bandwidth capacity of the alternative relay network, a bandwidth availability of the alternative relay network, or a data class of the data; and
routing the uplink data packet from the cell site to the core network using the alternative relay network, the alternative relay network being a relay network that is operated by a mobile carrier that operates the cellular network or an independent relay network that operates independently from the mobile carrier,
wherein the routing includes transmitting the amount of data between a first transceiver of the cell site and a second transceiver of the alternative relay network via a wireless link.

14. The computer-implemented method of claim 13, wherein the routing the uplink data packet includes:
inserting a first identifier of a backhaul router associated with the cell site into an uplink data frame that includes the uplink data packet;
sending the data frame to a relay router of the alternative relay network and adding a second identifier of the relay router to the uplink data frame;

transmitting the uplink data frame from the relay router to a server of the core network using the second identifier; and extracting the uplink data packet from the uplink data frame at the server of the core network.

15. The computer-implemented method of claim 13, wherein the routing the uplink data packet includes:

encrypting the uplink data packet and a private source address of a backhaul router associated with the cell site with a public key of an encryption certificate to form an uplink datagram;

appending a public destination address of a server of the core network and a transfer label that identifies the backhaul router to the uplink datagram;

sending the uplink datagram from the backhaul router to the server of the core network via a relay router of the alternative relay network; and decrypting the uplink data packet from the uplink datagram at the server using a private key of the encryption certificate.

16. The computer-implemented method of claim 15, wherein the relay router adds a public source address of the relay router to the uplink datagram during a transfer of the uplink datagram to the server, and wherein the decrypting includes decrypting the uplink data datagram in response to determining based on the public source address and the transfer label that the uplink datagram is valid.

17. The computer-implemented method of claim 16, further comprising:

decrypting the private source address from the uplink datagram at the server using the private key, and designating the uplink data packet as a valid data packet in response to determining that the private source address is registered as belonging to the backhaul router in a binding table entry that lists the public source address and the transfer label that identifies the backhaul router.

18. A mobile telecommunication network, comprising:
one or more processors; and
memory storing computer-executable instructions that, when executed, cause the one or more processors to perform acts comprising:

determining that a transmission of a downlink data packet from a core network to a cell site is to be offloaded from a cellular network to an alternative relay network based on a transmission route of an uplink data packet that is associated with the downlink data packet; and routing the downlink data packet from the core network to the cell site using the alternative relay network, the alternative relay network being a relay network that is operated by a mobile carrier that operates the cellular network or an independent relay network that operates independently from the mobile carrier, wherein the routing includes transmitting the amount of data between a first transceiver of the cell site and a second transceiver of the alternative relay network via a wireless link.

19. The mobile telecommunication network of claim 18, wherein the routing the downlink data packet includes:

encapsulating the downlink data packet in a downlink data frame that includes multiple identifiers, the multiple identifiers including a first identifier belonging to a relay router of the alternative relay network and a second identifier of a backhaul router associated with the cell site;

sending the data frame to the relay router of the alternative relay network using the first identifier;

removing the first identifier from the downlink data frame at the relay router; and relaying the downlink data frame from the relay router to the backhaul router associated with the cell site using the second identifier included in the downlink data frame.

20. The mobile telecommunication network of claim 18, wherein the routing the downlink data packet includes:

validating that each quality of service metric of the alternative relay network meets a corresponding threshold and that a relay router of the alternative relay network is a registered router;

encrypting the downlink data packet with a public key of an encryption certificate to form a downlink datagram;

appending a transfer label that identifies a backhaul router associated with the cell site to the downlink datagram;

sending the downlink datagram to the relay router of the alternative relay network such that the relay router uses the transfer label to discover a private destination address of the backhaul router for routing the downlink datagram to the backhaul router; and decrypting the downlink datagram at the backhaul router using a private key of the encryption certificate to obtain the downlink data packet.

* * * * *